United States Patent
Guo et al.

(10) Patent No.: US 12,216,448 B2
(45) Date of Patent: Feb. 4, 2025

(54) DEPENDABILITY NUMBER

(71) Applicant: Siemens Aktiengesellschaft, Munich (DE)

(72) Inventors: Zhensheng Guo, Forstern (DE); Christof Kaukewitsch, Munich (DE); Marc Zeller, Munich (DE)

(73) Assignee: Siemens Aktiengesellschaft, Munich (DE)

(*) Notice: Subject to any disclaimer, the term of this patent is extended or adjusted under 35 U.S.C. 154(b) by 236 days.

(21) Appl. No.: 17/414,349

(22) PCT Filed: Nov. 22, 2019

(86) PCT No.: PCT/EP2019/082245
§ 371 (c)(1),
(2) Date: Jun. 16, 2021

(87) PCT Pub. No.: WO2020/126306
PCT Pub. Date: Jun. 25, 2020

(65) Prior Publication Data
US 2022/0043419 A1    Feb. 10, 2022

(30) Foreign Application Priority Data
Dec. 20, 2018   (EP) .................... 18214703

(51) Int. Cl.
*G06Q 10/0637*    (2023.01)
*G05B 19/406*    (2006.01)

(52) U.S. Cl.
CPC ....... *G05B 19/406* (2013.01); *G06Q 10/0637* (2013.01); *G05B 2219/40361* (2013.01)

(58) Field of Classification Search
CPC ............................................ G06Q 10/0637
See application file for complete search history.

(56) References Cited

U.S. PATENT DOCUMENTS

| | | | |
|---|---|---|---|
| 6,243,614 B1 * | 6/2001 | Anderson ............... | G06F 30/00 700/103 |
| 6,772,019 B2 * | 8/2004 | Karas ..................... | G06Q 10/04 706/50 |

(Continued)

FOREIGN PATENT DOCUMENTS

FR    2999318 A1 *   6/2014   ............... B64F 5/60

OTHER PUBLICATIONS

J. R. Belland and D. Wiseman, "Using fault trees to analyze safety-instrumented systems," 2016 Annual Reliability and Maintainability Symposium (RAMS), Tucson, AZ, USA, 2016, pp. 1-6, doi: 10.1109/RAMS.2016.7448056.*

(Continued)

*Primary Examiner* — Jerry O'Connor
*Assistant Examiner* — Philip N Warner
(74) *Attorney, Agent, or Firm* — Schmeiser, Olsen & Watts, LLP

(57) ABSTRACT

A computer-implemented method and an apparatus for determining an optimal system configuration out of a plurality of candidate system configurations j is provided. The method includes: receiving data indicating a plurality of candidate system configurations j; determining quantitative dependability metric value for each of the plurality of candidate system configurations j, wherein the quantitative dependability metric value for each of the plurality of candidate system configurations is a dependability property fulfilment value $X_{ij}$ for each list of dependability properties i for each individual candidate system configuration j; and further on b) a dependability property weighting factor $K_i$ for each of the list of dependability properties i for all of the plurality of candidate system configurations j; and determining an optimal system configuration out of the plurality of candidate system configurations j on a quantitative compari- (Continued)

son between the quantitative dependability metric value for each of the candidate system configurations j.

11 Claims, 18 Drawing Sheets

(56) References Cited

U.S. PATENT DOCUMENTS

| | | | | |
|---|---|---|---|---|
| 8,694,328 B1* | 4/2014 | Gormley | ............ | B60W 30/182 |
| | | | | 705/26.7 |
| 8,732,109 B1* | 5/2014 | Carson | ............ | G06N 5/02 |
| | | | | 706/47 |
| 9,008,836 B2* | 4/2015 | Zhang | ............ | B25J 9/1687 |
| | | | | 700/201 |
| 9,348,951 B2* | 5/2016 | Xia | ............ | G06F 30/00 |
| 10,360,614 B1* | 7/2019 | Rifkin | ............ | G06Q 30/0282 |
| 10,607,039 B1* | 3/2020 | Kinderman | ............ | G05B 17/02 |
| 11,334,831 B2* | 5/2022 | Abu El Ata | ............ | G06F 17/10 |
| 2002/0072956 A1* | 6/2002 | Willems | ............ | G06Q 10/0639 |
| | | | | 705/7.29 |
| 2004/0123179 A1* | 6/2004 | Dragomir-Daescu | ............ | |
| | | | | G06Q 10/04 |
| | | | | 714/1 |
| 2006/0089920 A1* | 4/2006 | Ramesh | ............ | G06Q 30/02 |
| | | | | 705/400 |
| 2008/0300888 A1* | 12/2008 | Dell'Anno | ............ | G06Q 30/02 |
| | | | | 705/1.1 |
| 2011/0296249 A1* | 12/2011 | Merchant | ............ | G06F 11/3428 |
| | | | | 714/E11.062 |
| 2013/0282880 A1 | 10/2013 | Wee | | |
| 2013/0297972 A1* | 11/2013 | Yokote | ............ | G06F 11/3051 |
| | | | | 714/15 |
| 2015/0269013 A1 | 9/2015 | Höfig | | |
| 2016/0012171 A1* | 1/2016 | Visconti | ............ | G06F 30/3308 |
| | | | | 716/122 |
| 2018/0203963 A1* | 7/2018 | Eghbal | ............ | G06F 30/3308 |
| 2019/0258235 A1* | 8/2019 | Xenos | ............ | G05B 13/048 |

OTHER PUBLICATIONS

Golnaz Elahi, Eric Yu: Modeling and analysis of security trade-offs—a goal oriented approach., retrievable at ftp://www.cs.toronto.edu/dist/eric/ER07-Elahi.pdf.

Extended European Search Report dated May 19, 2019 for Application No. 18214703.3.

International Search Report and Written Opinion for PCT/EP2019/082245 issued Jan. 30, 2020.

* cited by examiner

FIG 4

| Failure Reason | Failure Mode | Failure Effect | Current RPN | Current P | Current D | Current S | Measure | New RPN | New P | New D | New S | Further Action |
|---|---|---|---|---|---|---|---|---|---|---|---|---|
| sensor defect | ommission | brake wears out and loses brake function | 112 | 2 | 7 | 8 | 1. suggestion: Redundant warning contact sensor on the other side of the same axis. If no signal then degraded mode. | 56 | 1 | 7 | 8 | no |
| | | | | | | | 2. suggestion: add status monitoring of warning contact | 16 | 1 | 2 | 8 | |

FIG 13

| j | 1 | 2 | 3 | 4 | 5 |
|---|---|---|---|---|---|
| Dependability Analysis Result | Without measure | Without redundancy | With monitoring Monitoring failure rate 10000 fit | With monitoring Monitoring failure rate 10 fit | With monitoring Monitoring failure rate 1 fit |
| Availability | 99,99998000000% | 99,999999999900% | 99,99995000000% | 99,99995000000% | 99,99995000000% |
| Unavailability | 2,40E-07 | 1,15E-13 | 4,81E-08 | 4,80E-08 | 4,80E-08 |
| MTBF | 1,00E+08 | 1,04E+14 | 4,98E+08 | 5,00E+08 | 5,00E+08 |
| Failure rate lambda | 1,00E-08 | 1,00E-14 | 2,01E-09 | 2,00E-09 | 2,00E-09 |
| FIT | 1,00E+01 | 9,60E-06 | 2,01E++00 | 2,00E+00 | 2,00E+00 |
| MDT | 24 | 12 | 24 | 24 | 24 |
| MTTF | 1,00E+08 | 1,00E+14 | 4,98E+08 | 5,00E+08 | 5,00E+08 |
| Mission time | 8760 | 8760 | 8760 | 8760 | 8760 |

FIG 19

| | Weight | DPN1 (actual) | DPN1 (expected) | Dependable 1? |
|---|---|---|---|---|
| Safety | 100 | | | |
| Reliability | 10 | | | |
| Availability | 1 | | | |
| Maintainability | 0,1 | | | |
| Security | 0,01 | | | |
| DPN (actual) | | 88,91 | | |
| DPN (expected) | | | 111,11 | |
| Dependable? | | | | No |

FIG 20

| Statistic | j=1 | j=2 | j=3 | j=4 | j=5 |
|---|---|---|---|---|---|
| Safety | 80 | 100 | 100 | 100 | 100 |
| Reliability | 8 | 10 | 10 | 10 | 10 |
| Availability | 0,8 | 1 | 0,2 | 0,2 | 0,2 |
| Maintainability | 0,1 | 0,1 | 0,1 | 0,1 | 0,1 |
| Security | 0,01 | 0,01 | 0,01 | 0,01 | 0,01 |
| $DPN_j$ | 88,91 | 111,11 | 110,31 | 110,31 | 110,31 |

DEPENDABILITY NUMBER

CROSS-REFERENCE TO RELATED APPLICATIONS

This application claims priority to PCT Application No. PCT/EP2019/082245, having a filing date of Nov. 22, 2019, which is based on EP Application No. 18214703.3, having a filing date of Dec. 20, 2018, the entire contents both of which are hereby incorporated by reference.

FIELD OF TECHNOLOGY

The following relates to a method for determining an optimal system configuration out of a plurality of candidate system configurations as well as to an apparatus, a computer program product, a data storage medium and a data stream for determining an optimal system configuration out of a plurality of candidate system configurations.

BACKGROUND

In many fields of industry, choices must be made between several possible candidate system configurations (or: "design alternatives") that may differ from one another by any of a plethora of small details and/or of large differences in structure. For example, an error-prone sensor in a system may be replaced by a more expensive and less maintainable but more accurate sensor, it may be replaced by two sensors of the same kind, a monitoring circuit for the sensor may be provided to monitor its behavior, it may be left as is, and so on.

Each of these four candidate system configurations may display different dependability properties, wherein the dependability properties comprise, or consist of:

Safety (inverse to risk to persons or equipment or environment);
Reliability (inverse to likelihood to break down);
Availability (inverse to likelihood to be unavailable);
Maintainability (ease of maintenance); and
Security (inverse to risk of being hacked or hijacked).

Many techniques are known to determine dependability properties for individual candidate system configurations, for example Hazard and Risk Analysis, Functional Hazard Analysis FHA, Failure Mode and Effect Analysis FMEA, Failure Modes, Effects and Diagnostic Analysis FMEDA, Failure Modes, Effects and Criticality Analysis FMECA, Threat and Risk Analysis TARA, Fault Tree Analysis FTA, Component Fault Tree CFT Analysis, Markov models, Reliability Block Diagrams, Attack Trees and so on.

Such issues are sometimes addressed by a so-called trade-off analysis.

For example, in the scientific publication "Golnaz Elahi, Eric Yu: Modeling and analysis of security trade-offs—a goal oriented approach.", retrievable at ftp://www.cs.toronto.edu/dist/eric/ER07-Elahi.pdf, in the following cited as "Elahi et al.", describes using vulnerability attack graphs and goal graphs to determine dependencies between security goals and tasks. The actual trade-off analysis is performed by "designer" with a graph model.

Trade-off analysis is used basically to identify and resolve potential conflicts and dependencies among dependability properties. Typically different design alternatives are the analysis objectives. The design alternative that fulfils most dependability properties will be normally chosen as the decision. However the results of trade-off analyses are either subjective qualitative values of expert estimation or quantitative but isolated from the quantitative dependability analysis techniques such as Component Fault Tree CFT and Failure Modes, Effects and Diagnostic Analysis FMEDA.

Thus, a more comprehensive and more accurate method based on wide-spread dependability analysis techniques is desired.

SUMMARY

An aspect relates to a computer-implemented method for determining an optimal system configuration out of a plurality of candidate system configurations, the method comprising: receiving data indicating a plurality of candidate system configurations;
  determining at least one quantitative dependability metric value for each of the plurality of candidate system configurations,
  wherein the at least one quantitative dependability metric value for each of the plurality of candidate system configurations is based on
  a) a dependability property fulfilment value for each of a list of dependability properties for each individual candidate system configuration; and further based on
  b) a dependability property weighting factor for each of the list of dependability properties for all of the plurality of candidate system configurations; and
  determining an optimal system configuration out of the plurality of candidate system configurations based on a quantitative comparison between the at least one quantitative dependability metric value for each of the plurality of candidate system configurations.

This approach closes the gap between the dependability trade-off analysis and industry-oriented quantitative analysis techniques that is present in the conventional art.

In the conventional art, the trade-off analysis of the dependability properties often assumes that the target values to be fulfilled by the design alternatives and actual values that the design alternatives hold are given. Based on these values, acceptable limits and evaluation criteria, trade-off analyses are done.

However this is not always the case as the actual quantitative values of dependability properties of candidate system configurations have to be obtained. Embodiments of the present invention for the first time teaches how quantitative dependability analysis techniques such as Component Fault Tree can help comparing the actual and target values, and how their relation to one another can be used in the broader context of a trade-off analysis. In other words, embodiments of the invention close the gap between quantitative dependability analysis techniques and a quantitative overall estimation of the dependability of the system according to certain candidate system configurations. In other words, trade-off analysis and dependability analysis are integrated into a single seamless method or system.

Advantageously, the at least one quantitative dependability metric value is a single number, herein designated as dependability priority number, DPN, as will be explained in more detail in the following.

A dependability property fulfilment value may be understood to be a value that indicates to which degree a desired dependability property goal for a specific dependability property is fulfilled by a specific candidate system configuration.

A dependability property weighting factor may be understood to be a weight, or importance, associated with a specific dependability property for all of the candidate system configurations.

For example, safety may be rated higher (comparatively larger weighting factor) than reliability (comparatively smaller weighting factor). In an embodiment, all of the dependability property weighting factors are different from one another.

According to a second aspect, embodiments of the present invention provide an apparatus for determining an optimal system configuration out of a plurality of candidate system configurations, the apparatus comprising a computing device with an input interface, a processor, a memory and an output interface,
- wherein the input interface is configured to receive an input signal comprising data indicating a plurality of candidate system configurations;
- wherein the computing device is configured to implement a dependability metric module and a optimizing module;
- wherein the dependability metric module is configured to determine at least one quantitative dependability metric value for each of the plurality of candidate system configurations,
- wherein the at least one quantitative dependability metric value for each of the plurality of candidate system configurations is based on
  a) a dependability property fulfilment value for each of a list of dependability properties for each individual candidate system configuration; and further based on
  b) a dependability property weighting factor for each of the list of dependability properties for all of the plurality of candidate system configurations;
- wherein the optimizing module is configured to determine an optimal system configuration out of the plurality of candidate system configurations based on a quantitative comparison between the at least one quantitative dependability metric value for each of the plurality of candidate system configurations; and
- wherein the output interface is configured to output an output signal indicating the determined optimal system configuration.

Such a computing system may comprise an input interface for receiving data such as information about the plurality of candidate system configurations (e.g. identifying the plurality of candidate system configurations), an output interface for outputting data such as an output signal indicating the determined optimal system configuration, a processor (CPU), and a memory (RAM and/or ROM memory).

The computing device may also be realized as a distributed or remote system, for example as a cloud computing platform.

In systems based on cloud computing technology, a large number of devices is connected to a cloud computing system via the Internet. The devices may be located in a facility, such as a factory or a hospital, connected to the cloud computing system. For example, the devices can comprise, or consist of, equipment, sensors, actuators, robots, and/or machinery in an industrial set-up(s). The devices can be medical devices and equipment in a healthcare unit or production machines in a factory environment. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web applications).

The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may comprise a plurality of servers or processors (also known as 'cloud infrastructure'), which are geographical distributed, connected with each other via a network. A dedicated platform (hereinafter referred to as 'cloud computing platform') is installed on the servers/processors for providing above functionality as a service (hereinafter referred to as 'cloud service').

The cloud computing platform may comprise a plurality of software programs executed on one or more servers or processors of the cloud computing system to enable delivery of the requested service to the devices and its users.

One or more application programming interfaces (APIs) may be deployed in the cloud computing system to deliver various cloud services to the users.

According to third aspect, embodiments of the invention provide a computer program product (non-transitory computer readable storage medium having instructions, which when executed by a processor, perform actions) comprising executable program instructions configured to, when executed, perform the method according to an embodiment of the first aspect.

According to a fourth aspect, embodiments of the invention provides a non-transient computer-readable data storage medium comprising executable program instructions configured to, when executed, perform the method according to an embodiment of the first aspect.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick, a memory card (e.g. an SD card) or the like.

According to fifth aspect, embodiments of the invention provides a data stream representing, or configured to generate, executable program instructions configured to, when executed, perform the method according to an embodiment of the first aspect.

Further advantages and embodiments will be evident from the dependent claims as well as from the description, taking into account also the attached figures.

In some advantageous embodiments, the at least one quantitative dependability metric for each of the plurality of candidate system configurations is based on mathematical products of dependability property fulfilment values with their respective dependability property weighting factor.

In formulae, when N is the number of dependability properties that are to be investigated for a specific system to be considered (or: to be designed) for which a plurality of candidate system configurations are available, when $X_{ij}$ designates the dependability property fulfilment value of candidate system configuration "j" for the dependability property "i", and when $K_i$ indicates the dependability property weighting factor for the dependability property "i", then the at least one quantitative dependability metric value is based on the N products $P_{ij}$ given by $P_{ij}=X_{ij}*K_i$.

This allows to assign different priority ratings, in form of the dependability property weighting factor $K_i$, to the different dependability properties. The dependability property weighting factors can be tailored to each system to be considered for improvement and to the goals set by the stakeholders.

In some advantageous embodiments, for each of the plurality of candidate system configurations a single dependability priority number as a quantitative dependability metric value is determined.

In other words, a single quantitative dependability metric value is determined (in particular: calculated) which is designated as a dependability priority number DPN.

Having a single numeric value into which all of the information about the different dependability properties of the candidate system configurations is distilled allows simple yet very informed decisions about the optimal system configuration. In some variants, the candidate system configuration with the highest dependability priority number DPN is chosen for the system to be considered (e.g. to be upgraded). In other variants, a more complex comparison of the dependability priority numbers DPN for the candidate system configurations is performed, for example a digit-wise comparison.

In some advantageous embodiments, the dependability priority number for each candidate system configuration is based on (is equal to) a sum of the mathematical products $P_{ij}$ of dependability property fulfilment values $X_{ij}$ with their respective dependability property weighting factor $K_i$.

In formulae, the dependability priority number $DPN_j$ for candidate system configuration "j" may be calculated based on $\Sigma_i X_{ij}*K_i$, wherein $\Sigma_i$ denotes the sum over i from 1 to N, i.e. over all dependability properties "i". In an embodiment, $DPN_j=\Sigma_i X_{ij}*K_i$.

In some advantageous embodiments, the dependability property fulfilment values $X_{ij}$ are determined within a respective predetermined value range $X_{i,min}<X_{ij}<X_{i,max}$ for each dependability property "i", and the dependability property weighting factors $K_i$ and the respective predetermined value ranges (i.e. the lower limit $X_{i,min}$ and the upper limit $X_{i,max}$ for each value range) are determined such that the total value ranges of the products $P_{ij}$ between dependability property values $X_{ij}$ and dependability weighting factors $K_i$ are distinct for each of the dependability properties "i". In other words, the lower limit $X_{i,min}$ and the upper limit $X_{i,max}$ for each i may be chosen such that a clear hierarchy can be formed such that $K_1*X_{1,min}<K_1*X_{1,max}<K_2*X_{2,min}<K_2*X_{2,max}< \ldots <K_N*X_{N,min}<K_N*X_{N,max}$.

This "separation of scales" in turn means that no amount of fulfilment of a first dependability property "i" (not even to the highest degree, i.e. when $X_i=X_{i,max}$) that is ranked lower than a second dependability property "i+1" can compensate for a decrease in the amount of fulfilment of the first dependability property "i+1" (not even when $X_{i+1}=X_{i+1,min}$).

Thus, a clear hierarchy of the dependability properties is established which yields, as one advantage, to quicker and easier determinations of the optimal candidate system configuration.

Moreover, the above described separation of scales allows to extract from the dependability priority number DPN at one glance which dependability properties are fulfilled to which degree.

In some advantageous embodiments, the lower limits $X_{i,min}$ for all dependability properties "i" are the same. In some advantageous embodiments, the upper limits $X_{i,max}$ for all dependability properties "i" are the same. Thus, in some embodiments, both the lower limits $X_{i,min}$ and the upper limits $X_{i,max}$ for all dependability properties "i" are the same. For example, $X_{i,min}=0$ and $X_{i,max}=1$ for all i.

The dependability property weighting factors $K_i$ may be defined such that they are separated from one another by always the same factor F, i.e. $K_N=F^1*K_{N-1}=F^2*K_{N-2}= \ldots =F^{N-1}*K_1$, wherein $F^k$ designates F to the k-the power. Specifically, F may equal 10, F=10. Thus, the dependability property weighting factors $K_i$ differ from one another only by powers of ten.

With F=10 and $X_{i,min}=0$ and $X_{i,max}=1$ for all i, each digit of the dependability priority number DPN indicates the fulfilment of one specific dependability property "i"; the first (largest) digit indicates the degree of fulfilment of the dependability property "N", and so on until the last (smallest) digit which indicates the degree of fulfilment of the dependability property "1".

In some advantageous embodiments, only discreet values are allowed (or: possible) for the $X_i$, in particular, when $X_{i,min}=0$ and $X_{i,max}=1$ for all i, the discrete values of:
  i) 0: totally unacceptable
    (i.e. dependability property goal not at all fulfilled);
  ii) 0.2: almost unacceptable;
  iii) 0.4: predominantly unacceptable;
  iv) 0.6: predominantly acceptable;
  V) 0.8: almost acceptable;
  vi) 1: totally acceptable
    (i.e. dependability property goal completely fulfilled)

In some advantageous embodiments, the dependability properties i comprise any or all of:
  safety;
  reliability;
  availability;
  maintainability; and
  security.

Although the above metrics are typically associated with the dependability, the term "dependability properties" may comprise, alternatively or additionally, properties such as any or all of:
  interoperability;
  portability;
  scalability;
  cost/benefit ratio;
  and/or the like.

In some advantageous embodiments, the method further comprises a step of determining, for at least one of the dependability properties "i", the dependability property fulfilment values $X_{ij}$ for the candidate system configurations "j" by comparing an actual dependability property value of each candidate system configuration "j" for the corresponding dependability property "i" with a target dependability property value. In an embodiment, this step is performed for all of the dependability properties "i".

In this way, a seamless integration of techniques and methods for determining the dependability properties with the overall trade-off analysis of dependability properties is provided.

In some advantageous embodiments, the method further comprises:
  generating an output signal based on the determined optimal system configuration;
  transmitting the output signal to a producing machine; and
  controlling the producing machine, by the output signal, to produce a system having the determined optimal system configuration.

The producing machine may, for example, be an automated production or assembly system configured for producing, manufacturing, and/or assembling the determined optimal system. For example, the system in this case may be a printed circuit being produced automatically by the producing machine, a robot assembled automatically by the producing machine and/or the like.

Alternatively, or additionally, the output signal may control a gathering machine to gather raw materials and/or input components (such as resistors, transistors, inductances and so on) based on (in particular: needed for) the determined optimal system configuration. The output signal may, further alternatively or additionally, also control a composing machine to compose (e.g. to write) a manual, a blueprint, a list of instructions, an explosion view and/or the like which indicates how the system having the determined optimal system configuration is to be produced (in particular: manufactured, constructed, assembled and/or the like).

In some advantageous embodiments of the apparatus according to the second aspect of an embodiment of the present invention, the output signal and the producing machine are configured such that the producing machine is controlled by the output signal to produce a system having the determined optimal system configuration.

Again, alternatively, or additionally, the system may also comprise a gathering machine configured to gather (e.g. raw) materials and/or input components based on the determined optimal system and/or a composing machine configured to compose a manual, a blueprint, a list of instructions, an explosion view and/or the like which indicates how the determined optimal system is to be produced. The output signal may be adapted to control any of those machines that are part of the system in any given embodiment of the second aspect.

Embodiments of the invention will be explained in yet greater detail with reference to exemplary embodiments depicted in the drawings as appended.

BRIEF DESCRIPTION

Some of the embodiments will be described in detail, with reference to the following figures, wherein like designations denote like members, wherein:

FIG. 4 shows a table illustrating a Risk Assessment performed in a variant of the embodiment of FIG. 1;

FIG. 13 shows a table indicating results for the candidate system configurations of FIG. 5 through FIG. 12;

FIG. 19 shows numerical results of an exemplary trade-off analysis;

FIG. 20 shows numerical results of an exemplary trade-off analysis;

Figure 21:
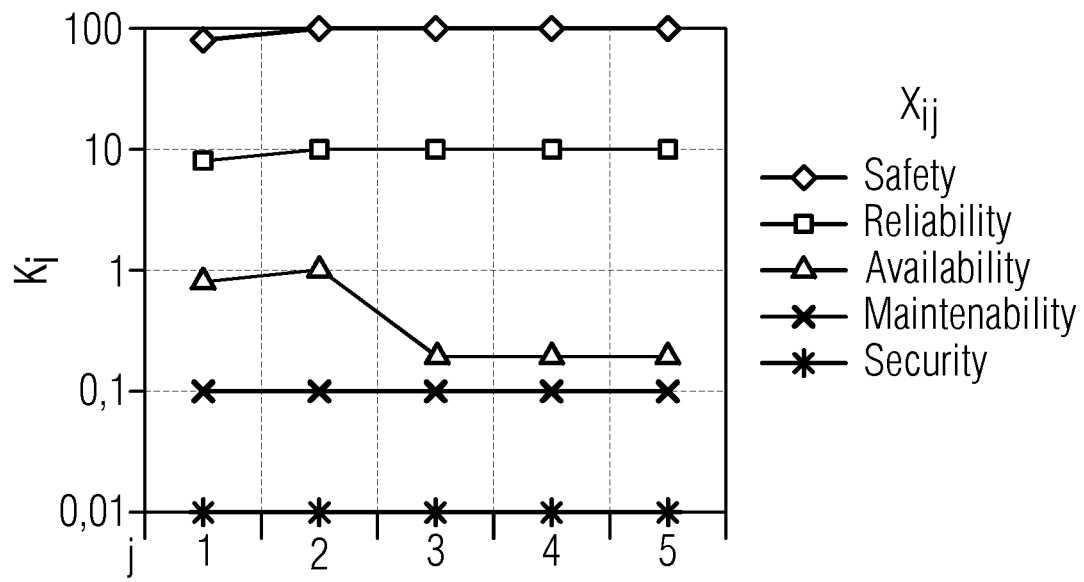
Figure 22:
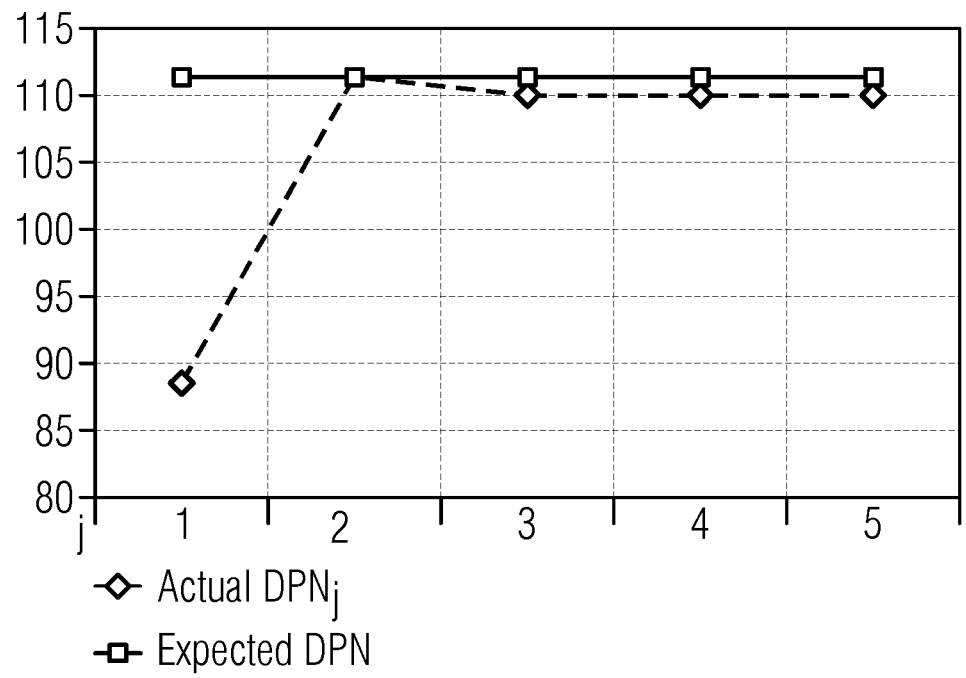
Figure 23:
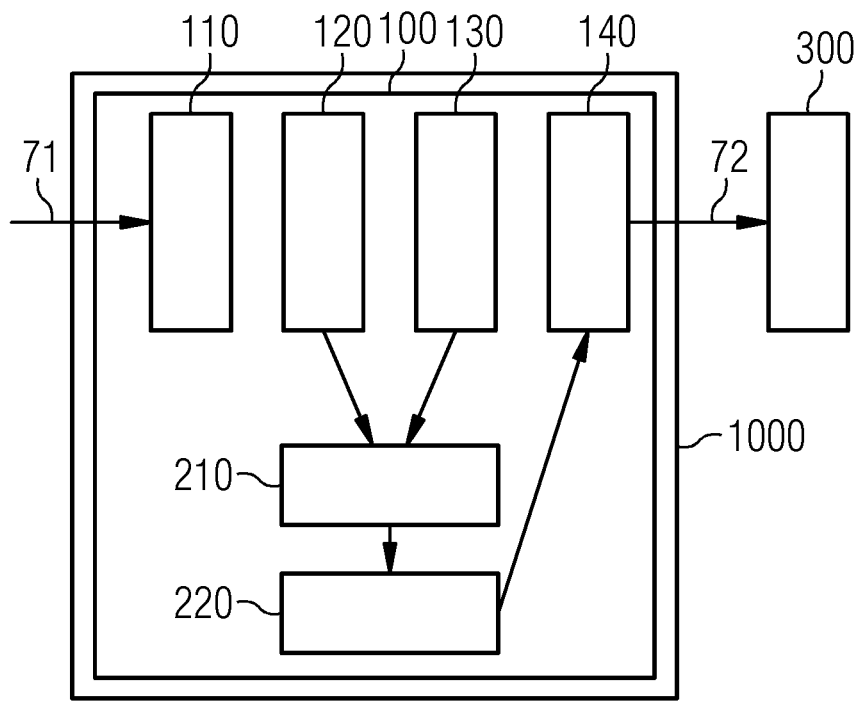
Figure 24:
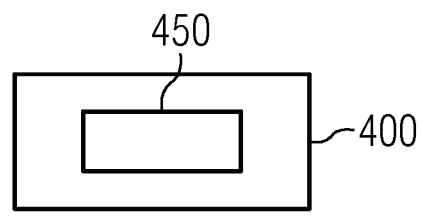
Figure 25:
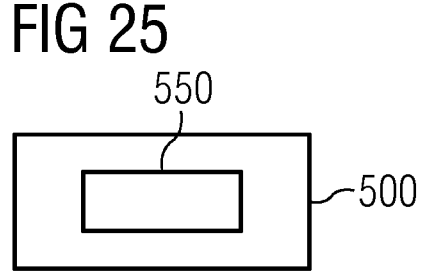

FIG. 21 graphically shows results of the exemplary trade-off analysis;

FIG. 22 graphically shows results of the exemplary trade-off analysis;

FIG. 23 shows a schematic block diagram illustrating an apparatus according to an embodiment of the second aspect of the present invention;

FIG. 24 schematically illustrates a computer program product comprising executable program instructions according to an embodiment of the third aspect of the present invention; and FIG. 25 schematically illustrates a non-transient computer-readable data storage medium according to an embodiment of the fourth aspect of the present invention.

Although specific embodiments have been illustrated and described herein, it will be appreciated by those of ordinary skill in the art that a variety of alternate and/or equivalent implementations may be substituted for the specific embodiments shown and described without departing from the scope of embodiments of the present invention. Generally, this application is intended to cover any adaptations or variations of the specific embodiments discussed herein.

DETAILED DESCRIPTION

Figure 1:
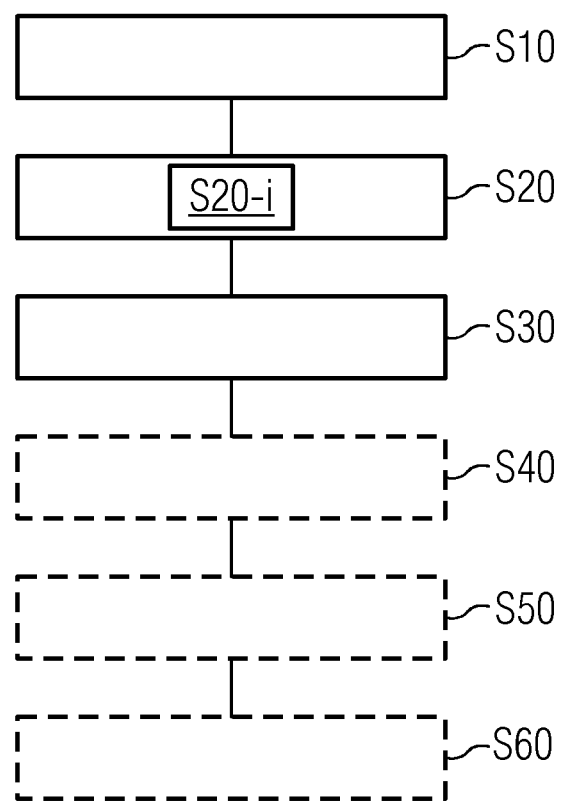
FIG. 1 shows a schematic flow diagram illustrating a method according to an embodiment of the first aspect of the present invention.

FIG. 1 shows a schematic flow diagram illustrating a method for determining an optimal system configuration out of a plurality of candidate system configurations.

In a step S10, data indicating a plurality of candidate system configurations for a system to be considered or designed or to be produced are received, e.g. by an input interface of a computing device.

In a step S20, at least one quantitative dependability metric value for each of the plurality of candidate system configurations is determined, wherein the at least one quantitative dependability metric value for each of the plurality of candidate system configurations is based on a) a dependability property fulfilment value $X_{ij}$ for each of a list of dependability properties "i" for each individual candidate system configuration "j" and further based on
b) a dependability property weighting factor $K_i$ for each of the list of dependability properties "i" for all of the plurality of candidate system configurations "j".

In an embodiment, as has been described in the foregoing, the at least one quantitative dependability metric value may be a single dependability priority number $DPN_j$ for each of the candidate system configurations "j". The dependability priority number $DPN_j$ may be calculated in any of the ways that have been previously described. Desirably, $DPN_j = \Sigma_i X_{ij} * K_i$.

Step S20 may comprise at least one sub-step S20-i of determining a dependability property fulfilment value $X_{ij}$ for one of the dependability properties "i" for at least one of the candidate system configurations "j" (for all of the candidate system configurations "j"), and may comprise sub-steps S20-i of determining the dependability property fulfilment value $X_{ij}$ for all of the dependability properties "i". Any known methods may be employed for this as will be explained in greater detail in the following.

Each sub-step S20-i may comprise sub-steps of identifying (or: eliciting, or receiving) goals of stakeholders, determining relevant scenarios based on the identified goals, identifying (or: eliciting) functional requirements based on the determined scenarios, and determining properties (such as a Risk Priority Number RPN, a Safety Integrity Level SIL and/or the like) of the candidate system configurations "j" based on the identified functional requirements, as will be explained in more detail in the following.

The sub-steps of identifying goals, determining relevant scenarios, identifying functional requirements and determining properties may also be performed once for all dependability properties "i" jointly.

Alternatively, or additionally, any or all functional requirements may also be received from an external source such as a domain authority.

In a step S30, an optimal system configuration out of the plurality of candidate system configurations "j" based on a quantitative comparison between the at least one quantitative dependability metric value for each of the plurality of candidate system configurations "j". This step may also be designated as a "trade-off analysis", as the information implicit in the determined quantitative dependability metric value is used to analyze the candidate system configurations and to determine the optimal one.

In an embodiment, when the quantitative dependability metric value is the dependability priority number $DPN_j$, the optimal system configuration is determined based on a comparison of the dependability priority numbers $DPN_j$. In some variants, the candidate system configuration "j" with the highest dependability priority number $DPN_j$ is determined as the optimal system configuration.

In other variants, e.g. when the dependability priority numbers $DPN_j$ are to be compared digit by digit, rules may be established according to which the optimal system configuration is determined based on the respective dependability priority numbers $DPN_j$. In the above-described variants where each digit of the dependability priority number $DPN_j$ indicates fulfilment of a goal for a specific dependability property "i", a hierarchy may be set according to which the digits of the dependability priority numbers $DPN_j$ for various candidate system configurations "j" are compared with one another.

For example, first the third digit of the dependability priority numbers $DPN_j$ may be compared and the candidate system configurations "j" may be selected with the highest value therein, next from the selected candidate system configurations "j" the second digit of the dependability priority numbers $DPN_j$ may be compared and so on until one or more optimal candidate system configurations "j" are found. The order of consideration for the digits of the dependability priority number $DPN_j$ corresponds to a hierarchy of importance, or priority, assigned to the individual digits and thus to individual dependability properties "i" in this example.

Optionally, the method may further comprise a step S40 of generating an output signal based on the determined optimal system configuration, a step S50 of transmitting the output signal to a producing machine, and a step S60 of controlling the producing machine, by the output signal, to produce the determined optimal system.

Figure 2:
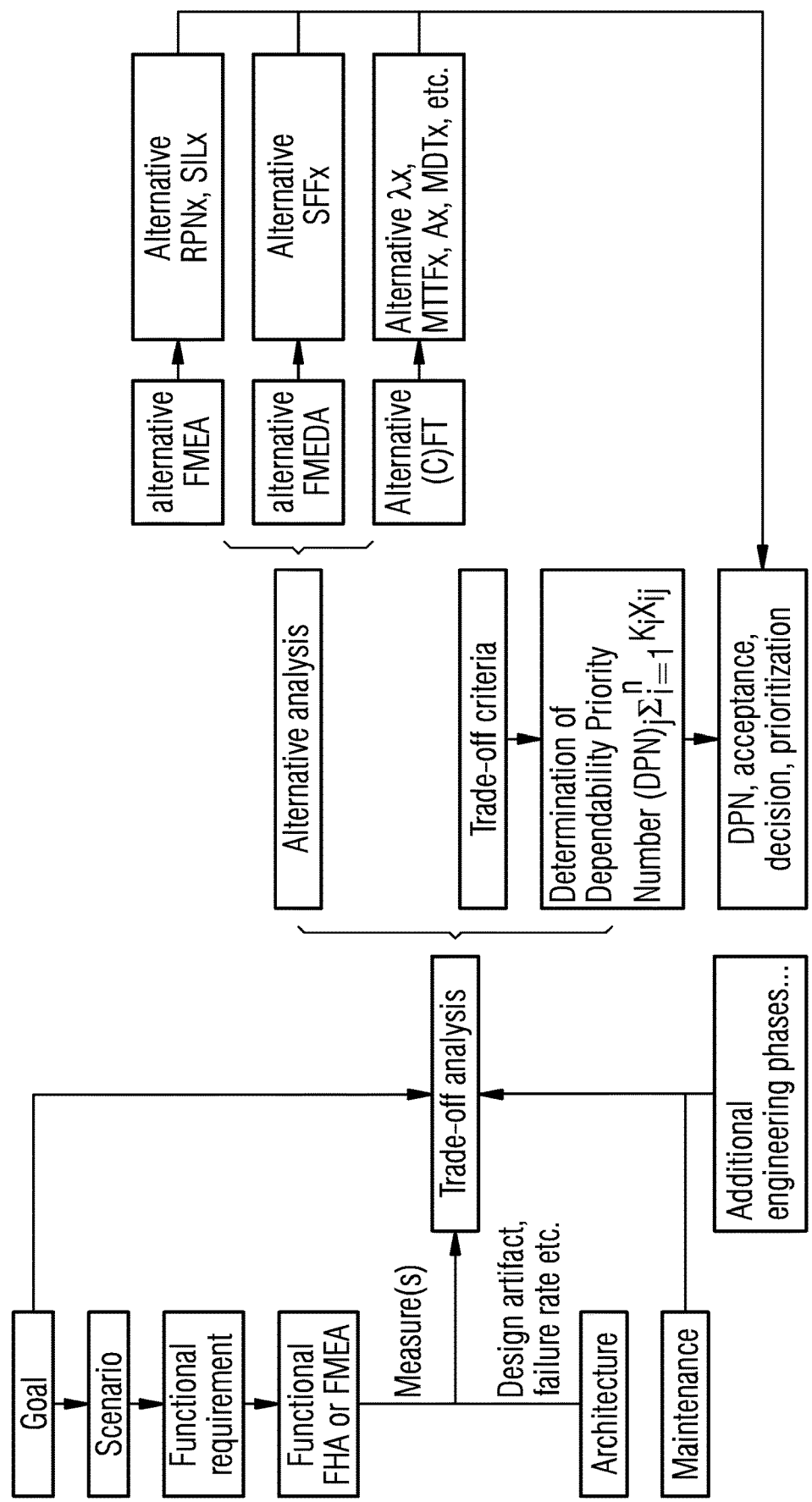
FIG. 2 shows a schematic block diagram illustrating a workflow of a variant of the embodiment of FIG. 1.

FIG. 2 show a schematic block diagram for illustrating a system 1000 for determining an optimal system configuration out of a plurality of candidate system configurations, according to an embodiment of the second aspect of the present invention.

The system 1000 comprises a computing device 100. The computing device 100 comprises an input interface 110, a processor 120, a memory 130 and an output interface 140.

The input interface 110 is configured to receive an input signal 71 comprising data indicating a plurality of candidate system configurations, in particular as has been described with respect to FIG. 1 and step S10.

The computing device 100 (in particular the processor 120 in operative connection with the memory 130, for example by the processor 120 executing program instructions stored in the memory 130) is configured to implement a dependability metric module 122 and a optimizing module 124.

The dependability metric module 122 is configured to determine at least one quantitative dependability metric value (the dependability priority number $DPN_j$) for each of the plurality of candidate system configurations "j", wherein the at least one quantitative dependability metric value for each of the plurality of candidate system configurations "j" is based on
a) a dependability property fulfilment value $X_{ij}$ for each of a list of dependability properties "i" for each individual candidate system configuration "j"; and further based on
b) a dependability property weighting factor $K_i$ for each of the list of dependability properties "i" for all of the plurality of candidate system configurations "j".

The dependability metric module 122 may perform these actions as has been described with respect to FIG. 1 and step S20 in the foregoing.

The optimizing module 124 is configured to determine an optimal system configuration out of the plurality of candidate system configurations "j" based on a quantitative comparison between the at least one quantitative dependability metric value for each of the plurality of candidate system configurations, as has been described with respect to FIG. 1 and step S30 in the foregoing.

The output interface 140 is configured to output an output signal 72 indicating the determined optimal system configuration.

The system 1000 may comprise a producing machine 200 (or, alternatively or additionally, a gathering machine, a composing machine and/or the like) to which the output signal 72 is transmitted. The output signal 72 and the producing machine 200 (and/or other machines of the sort) are configured such that the producing machine 200 is controlled by the output signal 72 to produce the determined optimal system (or, respectively, to gather corresponding (e.g. raw) materials or components, to compose a text regarding the determined optimal system and/or the like).

Figure 3:
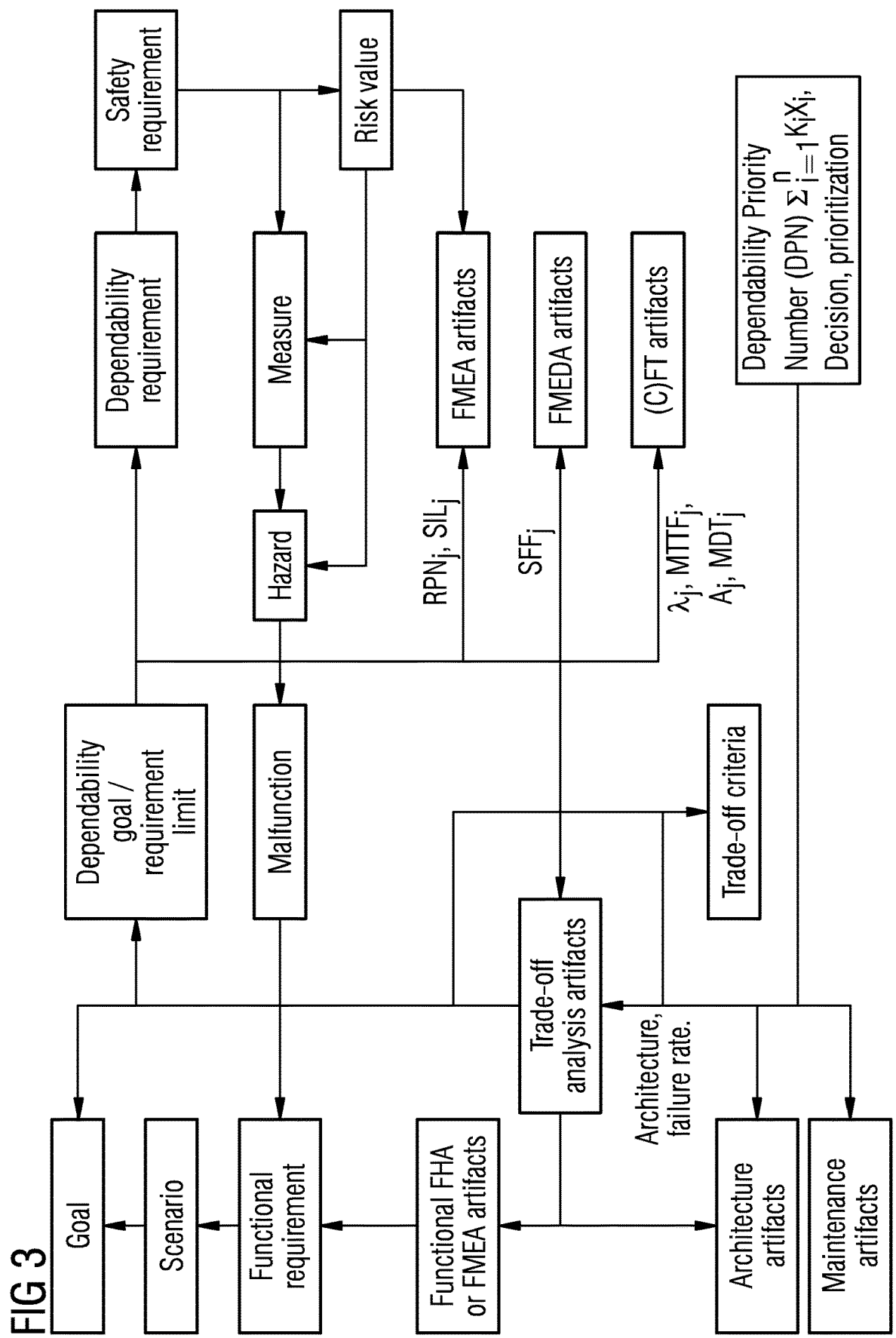
FIG. 3 shows a schematic block diagram illustrating a meta-model based on the dataflow of a variant of the embodiment of FIG. 1.

FIG. 3 shows a schematic dataflow for determining the dependability priority number $DPN_j$ in one possible embodiment.

"Goal" in FIG. 3 indicates the optional elicitation of the goals of the stakeholders. Here the typical goal graph methods, such as goal structure notation, i* for Non-Functional Requirements etc. may be used.

The goals may comprise target values for any or all of the dependability properties "i" and/or goals influenced or affected by the dependability properties "i".

A coarse trade-off analysis among the identified goals could be performed already at this step, in order to identify the possible dependencies and conflicts. This trade-off analysis could be done by use of goal graph methods.

Based on the identified goals, the relevant scenarios with certain execution sequences will be determined ("Scenario" in FIG. 3).

Such sequences including the sequence of stimulus, response in connection with ports, data, and environments, are e.g. described in "Elahi et al.". The scenarios define the circumstance in which the candidate system configurations (or: design alternatives) are made. An example of such scenarios is "robot X shall be stopped when safety bumper is engaged". Scenarios define the aims and scope of the trade-off analysis.

Functional requirements may then be elicited based on the identified scenarios. For safety-critical systems, it is possible that the functional requirements, hazards (to be handled by the designated system) and their tolerable hazard rate THR are given by the domain authorities. The method may thus comprise receiving a signal indicating functional requirements, hazards and/or tolerable hazard rates THRs; such a signal may also be received by the input interface 110 of the system 1000.

The trade-off analysis may thus also be performed without explicitly defining the goals and scenarios additionally for any system or component that have been defined clearly be the domain authorities in the signal. If there are no such standardized requirements and their tolerable hazard rate THR, the functional requirements are to be elicited.

Based on the identified functional requirements (or: demands), properties of the candidate system configurations "j" will be determined. For example, a functional hazard analysis or function-based FMEA will be performed. The corresponding hazards, their Risk Priority Numbers RPN, their Safety Integrity Level SIL, and available measures can thus be identified. For fulfilling the previously set goals (e.g. Safety Integrity Level SIL) additional measures could be identified.

In the conventional art, required measures for fulfilling the predefined Safety Integrity Level SILs are assessed by a risk assessment only once. Normally the evidence of the fulfillment of the Safety Integrity Level SIL (safety requirement) is described implicitly by the risk assessment.

But there is no indication available in the conventional art whether this measure is the most suitable one and whether the introduction of this measure could harm the fulfilment of other dependability properties (such as Availability) or not. Embodiments of the present invention solve these issues by considering a plurality of candidate system configuration and performing a trade-off analysis thereon.

In the given example, where there is no further information about the system components and their failure rates, a qualitative FMEA or FHA will be performed for each of the candidate system configurations such that the improvements of the quality in Safety Integrity Level SIL or Risk Priority Number RPN of the alternative could be compared with the first measure. The rest steps of a qualitative trade-off analysis will be performed, wherein the possible conflicts to other dependability availability could be identified. In these steps the expert estimation is required.

The individual candidate system configurations may correspond to different suggested or known measures for dealing with a given issue, as will be explained in more detail in the following.

Determining the dependability property fulfilment values in the at least one sub-step S20-$i$ may be based on, e.g. any or all of the following trade-off criteria:
  an actual value;
  an expected value;
  an acceptable upper limit;
  an acceptable lower limit;
  an evaluation of a benefit of the actual value;
  an evaluation of a drawback of the actual value;
  a cost of improving the actual value towards the expected value;
  a time-to-achievement of the improving;
  overall acceptance;
  further action.

The actual value may be obtained by Functional Hazard Analysis, Risk Priority Number through Failure Mode and Effect Criticality Analysis FMECA qualitatively, or quantitatively by the Failure Mode and Effect Diagnostic Analysis FMEDA, Component Fault Tree Analysis CFTA, Fault Tree Analysis FTA, or other quantitative dependability techniques.

For fulfilling the predefined quality goals (e.g. Safety Integrity Level SIL) additional measures could be identified. Normally the additional required measures for fulfilling the predefined Safety Integrity Level SIL are assessed by a risk assessment agency or module only once, and the evidence of the fulfillment of the Safety Integrity Level SIL (safety requirement) is described implicitly by the risk assessment.

The results of such analyses will be used for the rest of the quantitative dependability trade-off analysis as set forth herein. For example, a Failure Rate and a Safety Integrity Level SIL may be determined and/or calculated and then used for determining the dependability property of "Safety". A Mean Time Between/To Failure may be determined and/or calculated and then used for determining the dependability property "Reliability". An availability value may be determined and/or calculated and then used for determining the dependability property "Availability". A Mean Down Time may be calculated and/or determined and then used for determining the dependability property "Maintainability", and so on.

For example when Component Fault Tree CFT is chosen as trade-off analysis technique, quantitative details about the system to be considered are available. Different measures (reflected in, or realized by, different candidate system configurations) that affect the basic system design can be identified. Such measures are for example implementing additional redundancy, adding a monitoring mechanism etc. They have clear and defined influences on the architecture of the system to be considered (or evaluated). The resulting candidate system configurations resulting from the different measures (and optionally also a basic system to be modified by the measures) are than modeled by the Component Fault Tree CFT.

The calculated results for dependability parameters such as Mean Time to Failure MTTF, Failure Rate λ (lambda), Availability value A, Mean Down Time MDT etc. are then used for comparing the candidate system configurations. For example, for the dependability property "Safety", calculated (and/or even qualitative) Risk Priority Number RPN, Safety Integrity Level SIL, Mean Time to Failure MTTF, Failure Rate λ (lambda) and/or the like may be used as actual value. A corresponding expected value is typically predefined either by the authorities or by the references systems.

The dependability property fulfilment value is then determined based on trade-off criteria, at least based on the calculated and/or determined actual value and the expected value. For example, the dependability property fulfilment value may be based on a quotient, or a percentage, of the actual value with respect to the expected value, in particular directly proportional to the quotient or percentage.

However, additional trade-off criteria may be used to determine the dependability property fulfilment value, such as limits (or: thresholds).

For the dependability property "Safety", i.e. in the safety domain, the acceptable lower limit may e.g. be set as the predefined expected value. It is however also possible, a feasibility safety study of the system is the goal of the project, in this case the acceptable lower limit will be the expected acceptable lower limit.

In embodiments or variants where Failure Mode and Effect Diagnostic Analysis FMEDA is employed for determining a Safe Failure Fraction SFF (for estimation of the Safety Integrity Level), the Failure Mode and Effect Diagnostic Analysis FMEDA may be performed at least once for each candidate system configuration.

The calculated Safe Failure Fractions SFF and the corresponding Safety Integrity Levels SIL may then be used as respective actual value for comparison to an expected value in order to determine at least one of the dependability property fulfilment values $X_{ij}$.

In case a basic system configuration is set as a starting point (and also as one of the candidate system configuration, i.e. it is possible that no change at all is advised after the trade-off analysis), and a number of possible modifications resulting in candidate system configurations is considered by the method according to an embodiment of the invention, and when a measure neither leads to architecture changes nor to a structural change in the fault tree, the changed availability will be captured by e.g. the changed Mean Down Time.

For example, a warning contact may be provided to output a warning output signal indicating whether a brake of the train is worn out (has "worn out" status); for instance, the warning output signal may indicate a logical "HIGH" when the brake has the "worn out" status and a logical "LOW" when the brake does not have the "worn out" status.

Different system configuration candidates may, in this example, relate to which measures are to be taken when the output signal of the warning contact indicates the brake having the "worn out" status." One candidate system configuration may be the basic system configuration which is set up such that the measure is "stopping the train". Another candidate system configuration may be set up such that the measure is setting the train into a "low speed drive" mode.

The first measure of "stopping the train" heavily affects the dependability property "availability" negatively such that the dependability property fulfilment value $X_{ij}$ for the dependability property "availability" is determined to be 0 (indicating "totally unacceptable"); moreover, the measure of "stop" provides no remarkable improvement on the dependability property "Safety" compared to the measure "low speed mode".

On the other hand, the measure "low speed drive" is sufficient (regarding the dependability property "Safety") to handle the warning output signal indicating the "worn out" status of the brake. The "low speed drive" can thus replace "stopping the train" as measure in case of the output signal being "HIGH".

This change will clearly improve the dependability property "availability" of the train. This change does not necessarily change the structure of the fault tree of the train, but down time will be reduced. The reduced down time will affect the calculation of the dependability property "availability" A positively because of A=MTBF/(MTBF+MDT), wherein MTBF is the Mean Time Between Failures which remains unchanged and MDT is the Mean Down Time which is reduced.

In this way, the availability comparison between the basic system configuration with the measure "stopping the train" and new solution "low speed drive" can be done even without changing the fault tree structure.

The following categories made be provided for the trade-off criteria to be used for evaluating the alternative candidate system configurations:
a) benefit of better actual values:
  i) none;
  ii) longer useful life time because of higher quality;
  iii) better reliability or availability of the system;
  iv) potential public image benefit;
  v) eventually better sale price.
b) drawback of worse actual values:
  i) none;
  ii) no certificate;
  iii) financial disaster;
  iv) worse availability;
  V) damage of public image;
  vi) postponement of the project finish time;
  vii) increased purchase cost.
c) cost for improvement towards expected value:
  i) none;
  ii) ignorable;
  iii) proportional;
  iv) quite high;
  v) too high.
d) time to achieve the expected value:
  i) none;
  ii) ignorable;
  iii) proportional;
  iv) quite long;
  V) too long.
e) further action:
  i) none
  ii) redundancy
  iii) use of higher quality component
  iv) development of new component Based on the trade-off criteria, the following acceptance level values (i.e. numerical values for the dependability property fulfilment values $X_{ij}$) may be defined:
  i) 0: totally unacceptable;
  ii) 0.2: almost unacceptable;
  iii) 0.4: predominantly unacceptable;
  iv) 0.6: predominantly acceptable;
  V) 0.8: almost acceptable;
  vi) 1: totally acceptable The respective weighting factors $K_i$ for the dependability properties "i" may be set based on an expert opinion and on an importance of the individual dependability properties "i" for the system to be considered.

In some advantageous embodiments, one principle for defining the acceptance level values as well as the dependability property weighting factors $K_i$ is to make the differences in the dependability priority number $DPN_j$ between two alternative candidate system configurations "j" big enough and to avoid possible mutual counterweighing or compensating among the evaluation results.

For example, the following dependability property weighting factors $K_i$ may be set:
  a) "Safety": i=1, $K_1$=100;
  b) "Reliability": i=2, $K_2$=10;
  c) "Availability": i=3, $K_3$=1;
  d) "Maintainability": i=4, $K_4$=0.1;
  e) "Security": i=5, $K_5$=0.01.

Combined with e.g. the discrete acceptance level values of 0, 0.2, 0.4, 0.6, 0.8 and 1 defined above for the dependability property fulfilment values $X_{ij}$, this ensures that no change in any of the dependability property fulfilment values $X_{pj}$ (with i=p) can outweigh, or compensate, as far as the total value of the dependability priority number DPN is concerned, a change in any of the dependability property fulfilment values $X_{rj}$ (with i=r) when r<p.

In this embodiment, the smaller the value of "i" is, the more significant is the corresponding dependability priority "i". In the described example, the dependability property "Reliability" will be considered for deciding between a candidate system configurations "j'" and a candidate system configuration "j''" when the two candidate system configurations "j'" and "j''" yield e.g. the same dependability property fulfilment value for the dependability property "Safety", i.e. $X_{1j'}=X_{1j''}$.

With the dependability property weighting factor $K_i$ as defined above, as well as with the acceptance level values defined above for the dependability property fulfilment values $X_{ij}$, the maximum possible dependability priority number $DPN_j$ is then $100*1+10*1+1*1+0.1*1+0.01*1=111.11$.

As one possible application, in certain instances an increase of the dependability property fulfilment value $X_{1j}$ for the dependability property "Safety" may occur together with a decrease in the dependability property fulfilment value $X_{3j}$ for the dependability property "Availability". Using the dependability priority number $DPN_j$, it is possible to represent such potentially negative inter-dependencies of the dependability property fulfilment values $X_{ij}$. The selection of the optimal system configuration may be made based on (or: determined by) the highest dependability priority number $DPN_j$ and/or based on (or: determined by) the highest value of a dependability property fulfilment value $X_{ij}$ with the highest priority (e.g. based on the highest dependability property fulfilment value $X_{1j}$ for the dependability property "Safety" instead of e.g. the highest dependability property fulfilment value $X_{2j}$ for the dependability property "Reliability").

Determining S30 the optimal system configuration out of the plurality of candidate system configurations "j" may be performed based on a comparison of the total numeric value of the dependability priority number $DPN_j$. The highest numeric values of the dependability priority number $DPN_j$ corresponds to the best overall dependability (according to the previously defined values and criteria) of the candidate system configuration "j".

Determining S30 the optimal system configuration may in some embodiments consist of determining the candidate system configuration "j" with the highest dependability priority number $DPN_j$. In other advantageous embodiments, comparing the dependability priority numbers $DPN_j$ may only be part of determining S30 the optimal system configuration.

For example, determining S30 the optimal system configuration may comprise determining the first N (N being a pre-set integer value) candidate system configurations "j" with the N highest dependability priority numbers $DPN_j$ and then performing at least one additional analysis on the group of N candidate system configurations "j" selected in this way. The final decision which of the candidate system configurations "j" to select may then be further based e.g. additionally on the determined actual values of trade-off criteria. For instance, the Mean Time to Failure may be compared between the candidate system configurations "j" in the selected group, and the candidate system configuration "j" with the highest Mean Time to Failure may then be determined as the optimal system configuration.

An embodiment of the method may e.g. be performed by a portable computing system, e.g. a laptop or a portable edge device connected to a cloud computing platform. In a discussion with a current or potential customer, the customer may elicit goals or demands for a system to be designed. A user of the embodiment of the method may then model these goals and demands into the different trade-off criteria. The method then presents the user with e.g. a list of N candidate system configurations "j" that are available for achieving the goals and satisfying the demands of the customer. This task may otherwise, without the method, have been impossible to complete because after a certain number of goals and variable parameters the possible combinations require a prohibitive amount of computing power and memory.

However, in alternative embodiments, the dependability priority numbers $DPN_j$ may be calculated as described in the foregoing, but comparisons of different dependability priority numbers $DPN_j$ are performed digit-wise, i.e. by comparing each digit of the dependability priority number $DPN_j$ separately.

FIG. 3 shows a schematic block diagram illustrating a meta-model with data flows based on the workflow as described in the foregoing.

Malfunctions and hazards may be identified, for example, by use of functional hazard analysis FHA based on the determined functional requirements. Based on hazards and/or risk values, measures may be identified.

In a traditional safety analysis, only one measure for mitigating the risk of certain hazard is necessary. A sufficient measure is able to reduce the risk to the pre-defined acceptable level. However, for the overall dependability of a candidate system configuration implementing a specific measure it is necessary to know whether all the dependability properties "i" are fulfilled or not, and optionally to which degree.

Therefore, the trade-off analysis proposed herein is performed for different candidate system configurations "j", e.g. design alternatives. Design alternatives could be caused by different actuators being provided. The alternative measures could also consist of, or comprise, alternative treatments of one of such actuators. These alternative measures can be analyzed, one by one (in parallel) to determine which one fulfils the most of the dependability properties "j". The measures could be for example redundancy (providing two sensors for the same task) or extra monitoring of a single sensor, both of which could be used to mitigate the risk of a certain hazard such as a "false positive" of the sensor or a "false negative" of the sensor.

The parameters, or trade-off criteria, used to determine the dependability property fulfilment values $X_{ij}$ for alternative measures realized by different candidate system configurations may be results of qualitative or quantitative analyses. Such analyses are also possible after the dependability priority numbers $DPN_j$ have been determined and compared, in order to further differentiate between different candidate system configurations "j" and/or to better understand at least one of the candidate system configurations "j".

A qualitative analysis may comprise a functional hazard analysis FHA or Failure Mode and Affect Analysis FMEA for determining the reduced Risk Priority Number RPN or Safety Integrity Levels SIL resulting from the use of different measures in different candidate system configurations "j". Such results are represented as $RPN_j$ and $SIL_j$ for, respectively, each candidate system configuration "j".

A quantitative trade-off analysis may comprise repeated Failure Mode and Effect Diagnostic Analysis FMEDA or (Component) Fault Tree (C)FT Analysis for calculating the Failure Rates $\lambda_j$ (lambda), Mean Time To Failure $MTTF_j$, Mean Time Between Failures $MTBF_j$, Availability $A_j$, Mean Down Time $MDT_j$ and/or the like.

Through the comparison of the Failure Rates $\lambda_j$ (lambda) for all candidate system configurations "j", for example, the safer and/or more reliable measure can be identified. Further the comparison of aforementioned values could contribute to an overall evaluation of the dependability properties "i".

In the end, the actual value closest to the corresponding expected value will be considered as the more dependable value. Accordingly, in many variants the dependability priority number $DPN_j$ closest to the expected value $DPN^{expected}$ for the dependability priority number DPN (e.g. 111.11 as has been described in the foregoing)

The calculation of the expected value $DPN^{expected}$ and the actual value $DPN_j$ (which may be, more explicitly, designated as $DPN_j^{actual}$) are, as has been described in the foregoing, calculated by $DPN_j = \Sigma_i X_{ij} * K_i$, wherein the dependability property fulfilment values $X_{ij}$ are based on the evaluation of the trade-off criteria as mentioned previously.

In some advantageous embodiments, the expected value $DPN^{expected}$ for the dependability priority number DPN, and the actual values $DPN_j$ for the various candidate system configurations "j" are then used further to determine whether the $DPN_j \geq DPN_j \geq DPN^{expected}$: if this is the case, all the demands on the dependability properties "i" (or: goals) are fulfilled. If this is not the case, at least one, or even all, of the demands on the dependability properties "i" (or: goals) are possibly not fulfilled.

Which dependability property $DPN_j$ or dependability properties $DPN_j$, $DPN_k$, . . . are not fulfilled can be identified e.g. by comparing the expected value $DPN^{expected}$ with the actual values of the dependability priority number $DPN_j$ for a candidate system configuration "j" under analysis.

As has been described, in advantageous embodiments the allowed values of $X_{ij}$ and the dependability property weighting factors $K_i$ are chosen such that each digit of the dependability priority number $DPN_j$ clearly corresponds to one of the dependability properties "j", and the trade-off analysis does not only compare the overall numeric value of the dependability priority number $DPN_j$ but each of its digits individually.

In this case, advantageously the expected value $DPN^{expected}$ may encode thresholds for the individual dependability properties "j" that are at least to be met, and exceeded. For example, the dependability property weighting factors $K_i$ may be defined as above, wherein the individual weighting factors $K_i$ differ from one another by factors that are powers of 10, and in particular, where there is only a factor of 10 between each pair of adjacent dependability property weighting factors $K_i$, $K_{i+1}$ (i.e. $K_i = 10 K_{i+1}$). Furthermore, the values of the dependability property fulfilment values $X_{ij}$ may be allowed to be only in the range between 0 and 1, wherein 0 is included and wherein 1 may be included or excluded.

Then, when e.g. it is determined that the dependability property fulfilment of the dependability properties "Safety" (i=1), "Reliability" (i=2), "Maintainability" (i=4) and "Security" (i=5) must all be "totally acceptable" (corresponding to the dependability property fulfilment value $X_{1j} = X_{2j} = X_{4j} = X_{5j} = 1$), and when it is further determined that it is sufficient if the dependability property fulfilment of the dependability property "Availability" (i=3) is "predominantly acceptable" (corresponding to the dependability property fulfilment value $X_{3j} = 0.6$), then the expected value $DPN^{expected}$ for the dependability priority numbers $DPN_j$ may be not 111.11 as above but instead $DPN^{expected} = 110.71$.

If in these embodiments the individual digit of the dependability priority number $DPN_j$ is larger than, or equal to, the expected individual digit of the expected value $DPN^{expected}$ then fulfilment of the demands on that dependability property "i" is proven, otherwise the demands on that dependability property "i" are not fulfilled.

The unfulfilled dependability property demands thus require at least one further measure until all fulfilled. In the end all the demands on all the dependability properties "i" shall in the ideal case be fulfilled.

It is possible that there are conflicts by fulfilling demands on different dependability properties: for example, the fulfilment of demands on the dependability property "Safety" in certain circumstances decreases the availability. This happens, in the above example with the potential measures for dealing with an output signal of a brake warning contact of a train, for example if the train is stopped for certain safety reasons, which in turn means an immediate reduction of the dependability property "Availability".

In addition, both the dependability properties "Reliability"
and "Availability" may have a negative influence on the dependability property
"Maintainability"—for example, systems with more redundancy are in general more reliable and thus more available but the redundancies decrease ease of maintenance and/or increase the time needed for the maintenance.

It is also possible, that actually not all of the demands on all of the dependability properties "i" can be fulfilled, but this could also be a result that the stakeholders would like to know/achieve.

For instance, for a system under development, a capability study of the fulfilment of certain demands on the dependability property "Safety" or other dependability properties could be essential. In other words, a product certification feasibility of an existing system towards Safety Integrity Level SIL 2 and $\lambda$ (lambda) of $10^{-6}$/h could be investigated.

After the investigation, the result could be that the demands of certification of Safety Integrity Level SIL 2 and of a $\lambda$ (lambda) of $10^{-6}$/h cannot both be fulfilled for the current version of the product. If the certification is not a mandatory requirement, this analysis result may already be sufficient, and may save numerous hours of experimental testing and tweaking.

Here the decisions of acceptance and/or where to stop the analysis can be made based on the comparison of the individual dependability priority numbers $DPN_j$ and the expected value $DPN^{expected}$ for them, and even on the comparison of the individual dependability priority numbers $DPN_j$ between alternative measures, i.e. candidate system configurations "j".

Further a prioritization of the measures (i.e. candidate system configurations "j") may be made based on the individual dependability priority numbers $DPN_j$.

Not only quality goals and functional requirements are possible objects of the trade-off analysis; also design artefacts and maintenance artefacts are potential objects. Design artefacts offer e.g. design alternatives. Maintenance artefacts may e.g. be a number of maintenance teams and/or a possible maintenance strategy as conditions which also play a role in determining a maintenance priority number (basically the calculable Mean Down Time MDT).

In the following, the previously mentioned example of a brake warning contact will be used to describe additional advantageous options and variants of embodiments of the method of FIG. 1.

Ideally, the brake warning contact is supposed (functional requirement) to send a warning signal to a dashboard (in the train and/or in a remote operating facility for the train) and set the train to a "degraded mode".

Next, a Failure Mode and Effect Criticality Analysis FMECA (and/or Functional Hazard Analysis and/or Failure Mode and Effect Analysis FMEA as shown in FIG. 2) may be performed to identify measures.

Based on the identified functional requirement, possible failure modes and measures will be determined. In addition, the Risk Assessment may also be performed. The Failure Mode and Effect Criticality Analysis FMECA for dependability analysis may be different from a traditional Failure Mode and Effect Criticality Analysis FMECA, because more than one measure for the same failure mode could be identified. The effects of the different measures are then compared qualitatively through the comparison of the improved Risk Priority Number RPN and quantitatively through the comparison of the dependability priority number DPN based on i.e. quantitative component fault tree analysis.

In the present example, two main types of measures will be considered to have been identified:
M1: redundancy
 (providing more than one brake warning contact)
M2: monitoring
 (monitoring the state of health of the brake warning contact)

FIG. 4 shows a schematic and exemplary table of calculated values for these two measures M1 and M2. "Current RPN" and "New RPN" indicate current and new (after the corresponding measure) "Risk Priority Number"; "Current P" and "New P" indicate current and new (after the corresponding measure) "Probability of Failure"; "Current D" and "New D" indicate current and new (after the corresponding measure) "Probability of Detection" of an error; and "Current S" and "New S" indicate current and new (after the corresponding measure) "Severity" or the error.

These two measures M1, M2 are compared according to the dependability goals. The new Risk Priority Numbers RPN ("New RPN") according to each measure M1, M2 will be compared. However, at this stage, the performed Risk Assessment result could be misleading. For example, in the risk assessment illustrated in FIG. 4, the Risk Priority Number of the monitoring measure M2 is 16 which is lower (and thus better) than the Risk Priority Number of 56 of the redundancy measure M1.

However, the quantitative analysis later on will show that the redundancy measure M1 is the only approach that fulfils all the set dependability goals. It may thus be arranged that the qualitative analysis shall be verified by the quantitative analysis.

To perform a quantitative dependability analysis, the Failure Mode and Effect Diagnostic Analysis FMEDA for the two measures M1, M2 may be first performed. Through the Failure Mode and Effect Diagnostic Analysis FMEDA the dangerous undetected failure rates can be identified. For example, the dangerous undetected failure rate of the redundancy measure M1 may be 5 FIT, the dangerous undetected failure rate of the monitoring measure M2 may be 1 FIT.

The Failure Rate (measured in Failures In Time FIT) of a device is the number of failures that can be expected in one billion ($10^9$) device-hours of operation, (e.g. 1000 devices for 1 million hours, or 1 million devices for 1000 hours each, or some other combination.) The relationship of FIT to Mean Time Between Failures MTBF may be expressed as $MTBF=10^9$ device-hours=1/FIT.

The above Failure Rates are then used to calculate the system overall Failure Rate. The goal of the calculation is to determine which failure rate with candidate system configuration "j" leads to a lower (i.e. better) failure rate.

Next, Component Fault Tree Analyses CFT for the following candidate system configurations j=1, j=2, j=3 may be performed:

First, we will consider the case of j=1 corresponding to the basic system without any additional measure: the failure rate of the function "brake warning contact" is 5 FIT.

Because the redundancy measure M1 (j=2) does not include or provide any additional detection and control mechanism to reduce the failure rate, the failure rates of the function "brake warning contract" for the case without measure (j=1) and for the case with the redundancy measure M1 j=2) are the same.

But for the monitoring measure M2 (j=3), the dangerous undetected failure rate of this function decreases, in the present example to 1 FIT. The assumption for this effect is that the monitoring detects 90% dangerous failure. In summary, the failure rate used in the Component Fault Tree Analysis CFT of the redundancy measure M1 (j=2) is 5 FIT. The failure rate used in CFT for the monitoring measure M2 (j=3) is 1 FIT.

Figure 5:
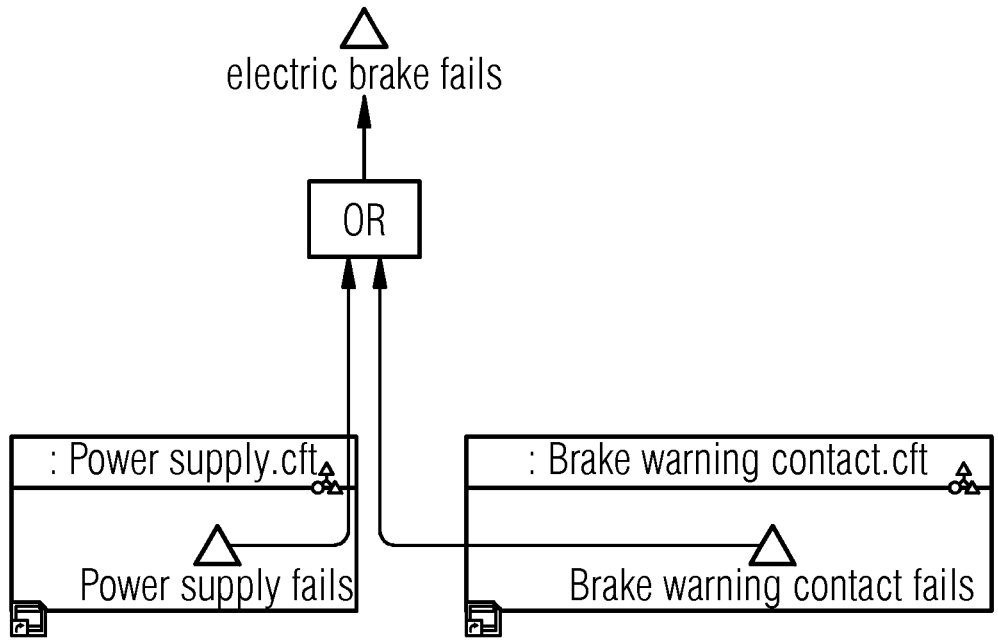
FIG. 5 shows Component Fault Trees and RAMS analysis results for a candidate system configurations in an exemplary case study.

FIG. 5 shows a schematic Component Fault Tree for the candidate system configuration without measures (j=1) which illustrates the either a failure of the power supply (lower left: "Power supply fails") of an electric brake of the train, and/or (see logical "OR" in FIG. 5) a failure (lower right: "brake warning contact fails") of the brake warning contact may result in the effect "electric brake fails".

Figure 6:
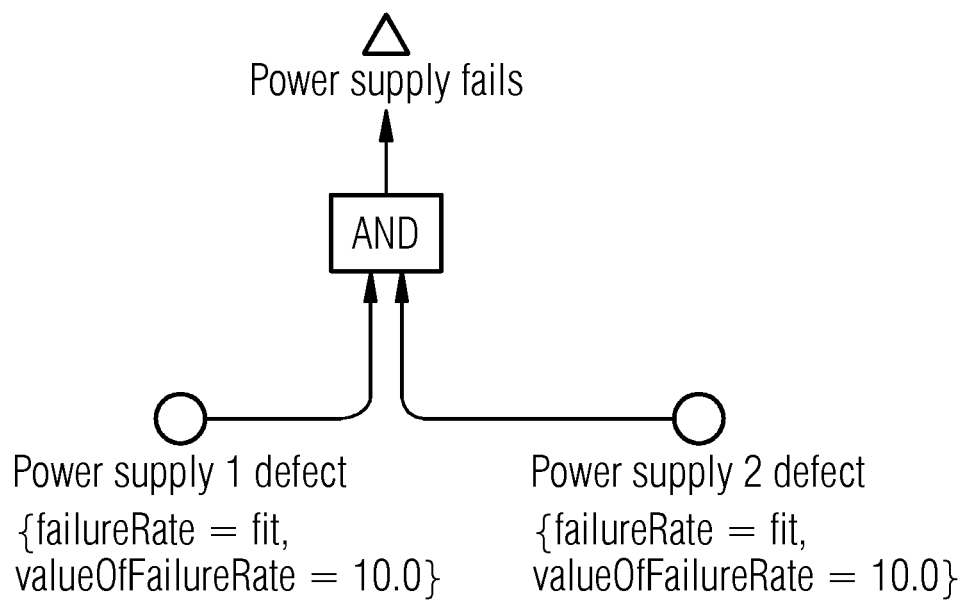
FIG. 6 shows Component Fault Trees and RAMS analysis results for another candidate system configurations in an exemplary case study.

The element "power supply fails" may have its own Component Fault Tree as shown in FIG. 6, according to which the power supply comprises two individual power supplies 1 and 2 and only fails when both of them (see logical "AND" in FIG. 6) fail. In FIG. 6, a failure rate for each individual power supply is illustrated to be assumed to be 10 FIT.

Figure 7:
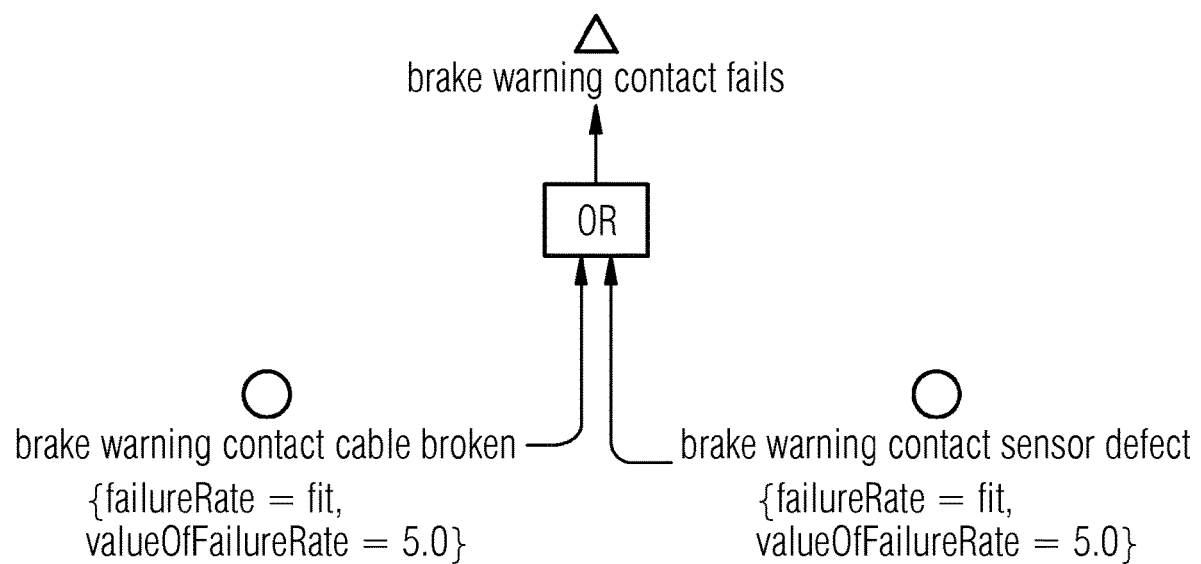
FIG. 7 shows Component Fault Trees and RAMS analysis results for another candidate system configurations in an exemplary case study.

Similarly, FIG. 7 shows a possible Component Fault Tree for the element "brake warning contact fails": this may be either the result of the break warning contact cable being broken (lower left, assumed dangerous undetected failure rate of 5 FIT) and/or (see logical "OR") of the brake warning contact sensor itself being defect (lower right, assumed dangerous undetected failure rate of 5 FIT).

Figure 8:
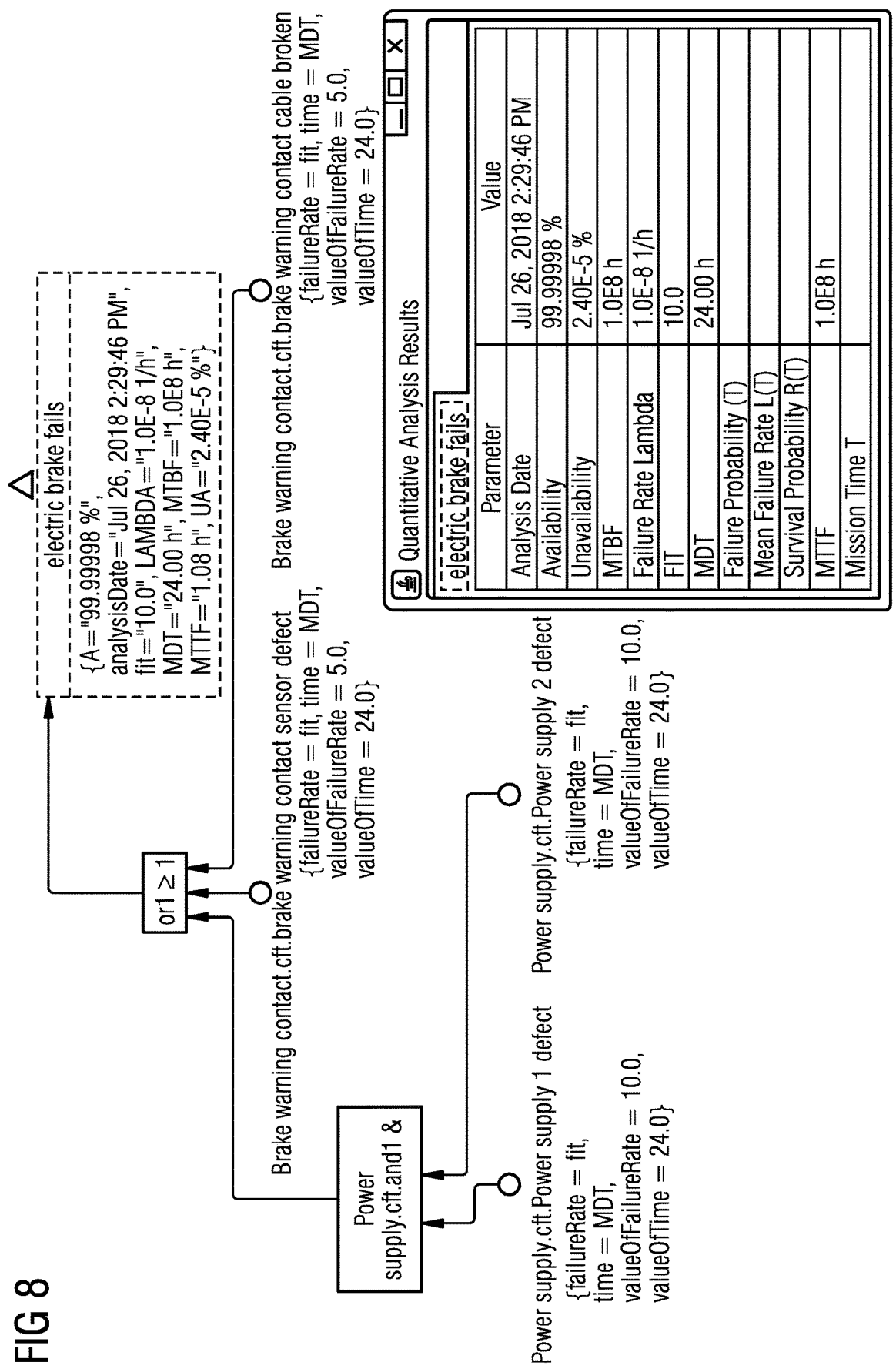
FIG. 8 shows Component Fault Trees and RAMS analysis results for another candidate system configurations in an exemplary case study.

Based on the Component Fault Tress of FIG. 5 through FIG. 7 and the assumed failure rates therein, and with the assumption of a Mean Down Time of 24 hours and mission time of 8760 hours, a Mean Time Between Failures MTBF for the dependability property "Reliability", an Availability value A for the dependability property "Availability", a Mean Down Time MDT value for the dependability property "Maintainability" and a total Failure Rate value for the dependability property "Safety" can be calculated. The complete Component Fault Tree for the system without additional measure (j=1) with a corresponding RAMS analysis is schematically shown in FIG. 8.

RAMS is an acronym for Reliability, Availability, Maintainability, and Safety. According to common definitions:
"Reliability" is an ability of a system to perform a specific function and may be given as design reliability or operational reliability;
"Availability" is the ability of a system to be kept in a functioning state;
"Maintainability" is determined by the ease with which the system can be repaired or maintained;
"Safety" is the requirement not to harm people, the environment, or any other assets during the life cycle of the system; and
"Security" is the ability of the system to withstand attempts to compromise the integrity of its data or signals (e.g. attempts to access, steal, corrupt, or manipulate data or signals).

Next, we will consider the candidate system configuration j=2, wherein the redundancy measure M1 has been adopted.

With the redundancy measure M1 (j=2), the brake warning contact has been cloned and attached onto the OR-gate of the Component Fault Tree. Because of the redundancy, an AND-gate is added into the component fault tree. This AND-gate is then hanged under the OR-gate, see FIG. 9, which shows the analogue of FIG. 5 (j=1) in the candidate system configuration j=2.

Figure 10:
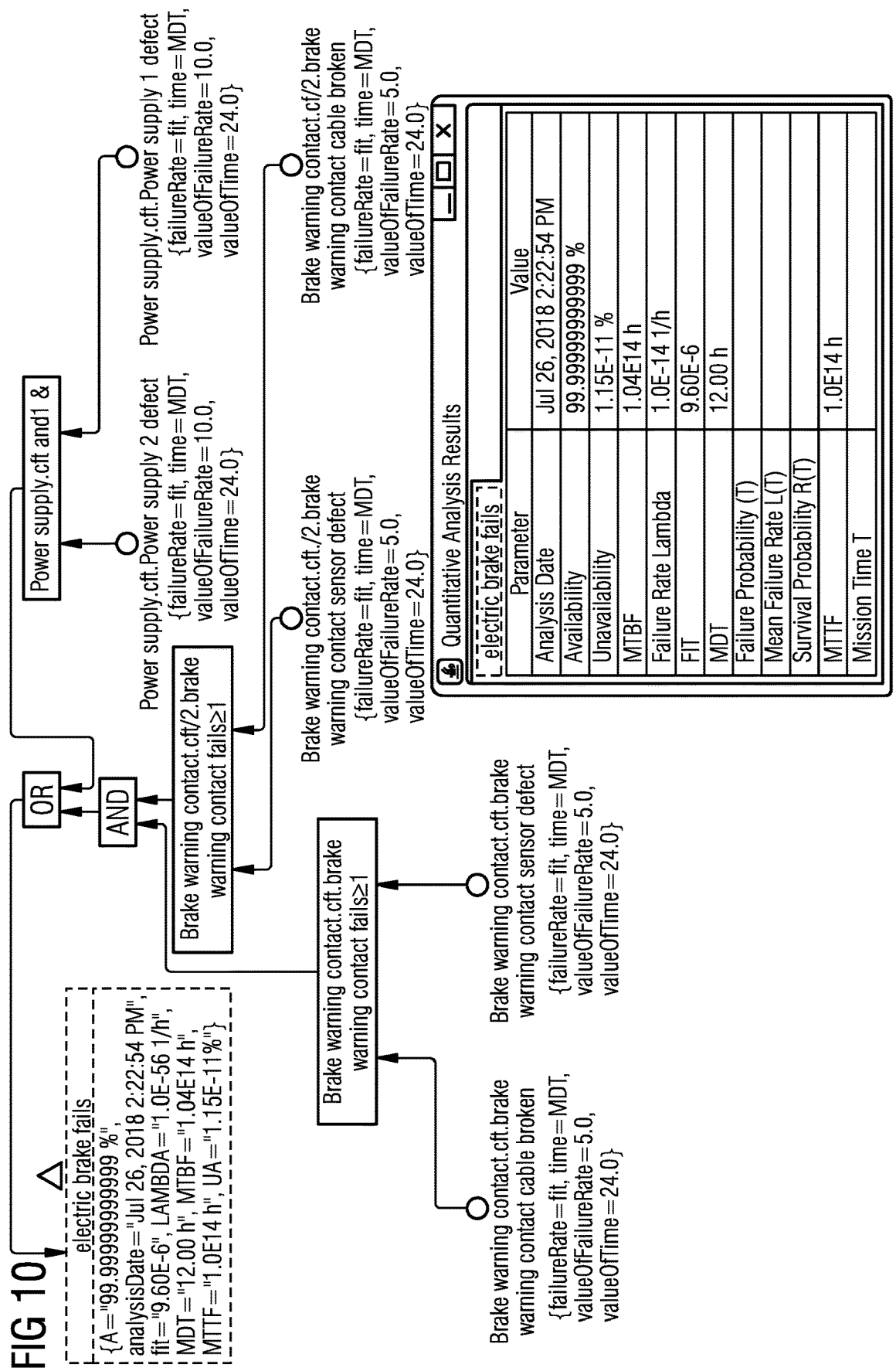
FIG. 10 shows Component Fault Trees and RAMS analysis results for another candidate system configurations in an exemplary case study.

FIG. 10 schematically shows the analogue of FIG. 7 (j=1) for the candidate system configuration j=2.

Next, we will consider the candidate system configuration j=3, wherein the monitoring measure M2 has been adopted.

With the monitoring measure M2 (j=3), the failure rate of the observed sub-system (brake warning contact) will be reduced. In the present example, it is assumed that the monitoring mechanism captures 90% of the dangerous failures such that the resulting dangerous undetected failure rate is 1 FIT.

However, the use of the monitoring mechanism introduces additional failure possibilities, because the monitoring can also fail. In this case, the brake warning contact fails if:
1. the monitoring fails and the brake warning contact (9 FIT) detectably fails;
or
2. the brake warning contact fails in the "dangerous undetected" way (1 FIT)

Figure 11:
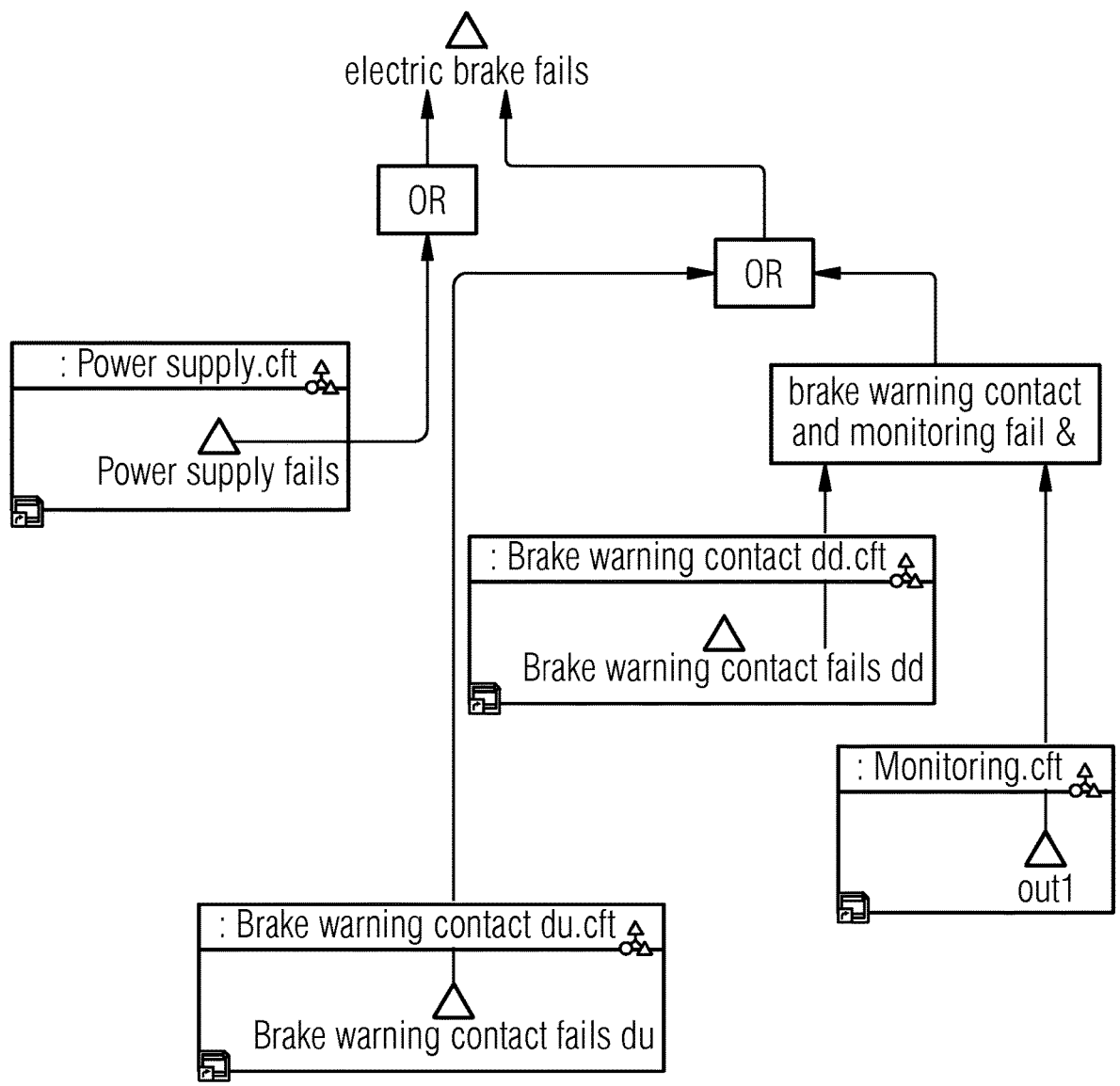
FIG. 11 shows Component Fault Trees and RAMS analysis results for another candidate system configurations in an exemplary case study.
Figure 12:
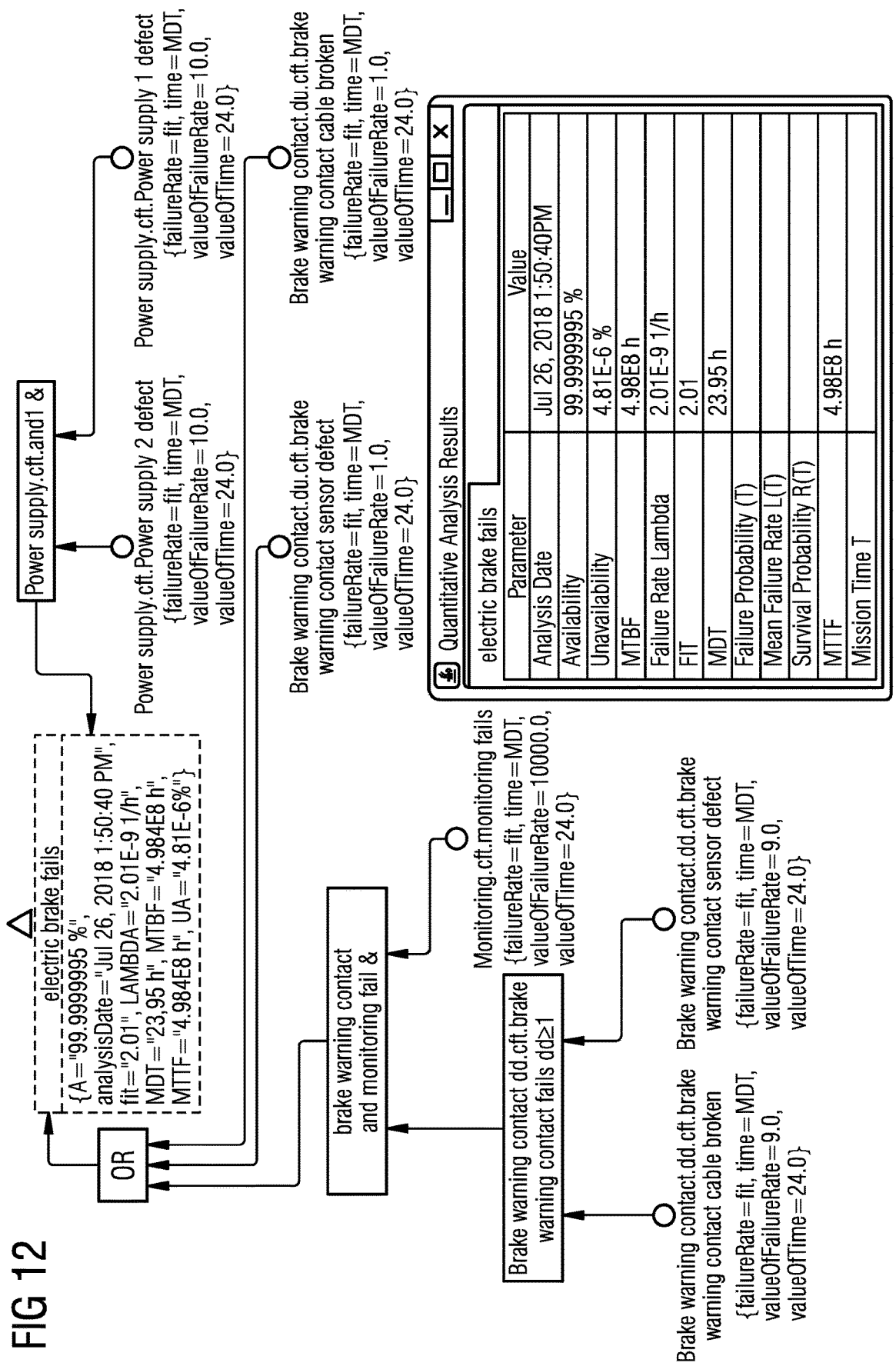
FIG. 12 shows Component Fault Trees and RAMS analysis results for another candidate system configurations in an exemplary case study.

FIG. 11 and FIG. 12 illustrate this situation. FIG. 11 schematically shows the analogue of FIG. 5 (=1) and FIG. 8 (j=2) for the candidate system configuration j=3.

Figure 9:
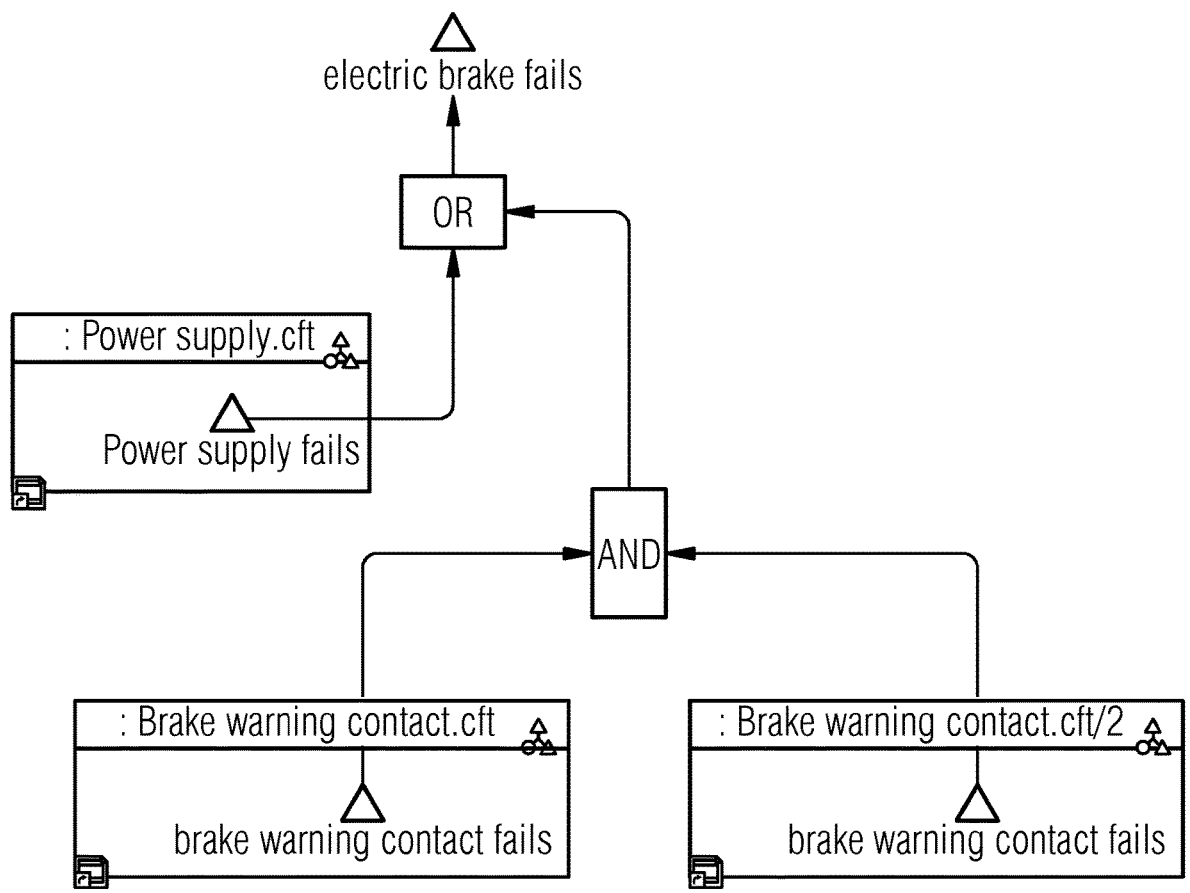
FIG. 9 shows Component Fault Trees and RAMS analysis results for another candidate system configurations in an exemplary case study.

FIG. 12 schematically shows the analogue of FIG. 7 (j=1) and FIG. 9 (j=2) for the candidate system configuration j=3, with an assumed failure rate of the monitoring circuit of 10000 FIT.

The component brake warning contact is used two times, representing the two cases mentioned above. However, it is only possible to assign one failure rate to one component in the Component Fault Tree, therefore two components with slightly
naming difference are used: "brake warning contact dd" (dangerous detected) and "brake warning contact du" (dangerous undetected). The failure rate of monitoring clearly also plays a role.

It may therefore be useful to investigate the impact of different monitoring circuits (e.g. sensors or the like), in particular of monitoring circuits with different failure rates of the monitoring. Monitoring circuits with lower failure rates are generally more expensive and/or larger (have a larger footprint) so that it is often important to know if these expenses and/or size issues are worth it in terms of increased dependability.

In the following, candidate system configuration equal to the candidate system configuration j=3 are considered, but with a failure rate of 10 FIT (j=4) for the monitoring circuit and with a failure rate of 1 FIT (=5) for the monitoring circuit are considered in addition.

The reason behind this selection is that 10 FIT (=4) and 1 FIT (j=5) are the closest to the brake warning contact du (1 FIT). 10000 FIT (j=3) has been selected with the intention of producing a significant difference in the evaluation result for instructive purposes.

FIG. 13 shows a table collecting RAMS results for all of the five candidate system configurations j=1 . . . 5.

In a next step, the calculated values or parameters are used to determine the dependability property fulfilment values $X_{ij}$. As has been described, this is done by comparing the calculated actual values for the different candidate system configurations "j" to corresponding reference values such as expected values, upper/lower acceptable limits and so on (see trade-off criteria listed above).

The following FIGS. 14 to 18 show comparisons between expected values and actual values of respective dependability/RAMS parameters. In the present simple example, the acceptable limit is set to the expected value for simplicity. In many real-world applications, the comparison is done between the actual acceptable limit for the dependability parameters and the actual values of the dependability parameters, and the dependability property fulfilment values $X_{ij}$ are then based on the comparison.

For example, the expected value for the Failure Rate (as a dependability parameter mainly connected to the dependability property "Safety") is 10 FIT, so this value is used five times for comparison (for candidate system configuration j=1 . . . 5). In each of the FIGS. 14 to 18, square points indicate respective expected values (constant in each Fig.), and diamond-shaped points indicate the actual values of the dependability parameters for each candidate system configuration "j".

Figure 14:
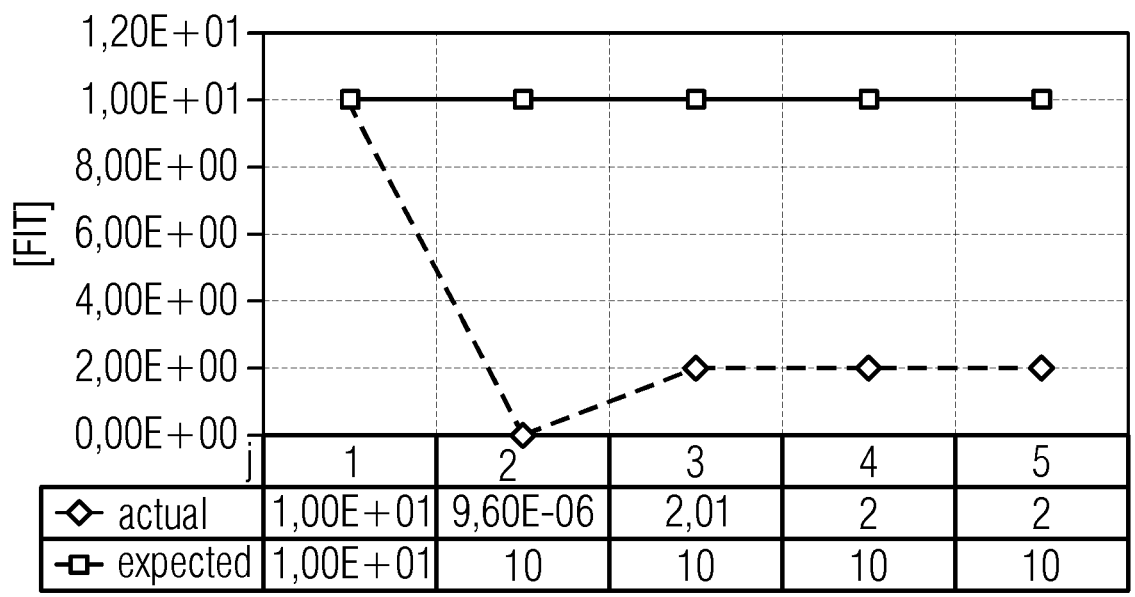
FIG. 14 shows a comparison between expected values and actual values of respective dependability parameters used to determine the dependability property fulfilment values.

FIG. 14 shows the comparison of the expected and actual values for the Failure Rates (relevant for the dependability property "Safety") for j=1 . . . 5 (horizontal axis) in FIT.

Figure 15:
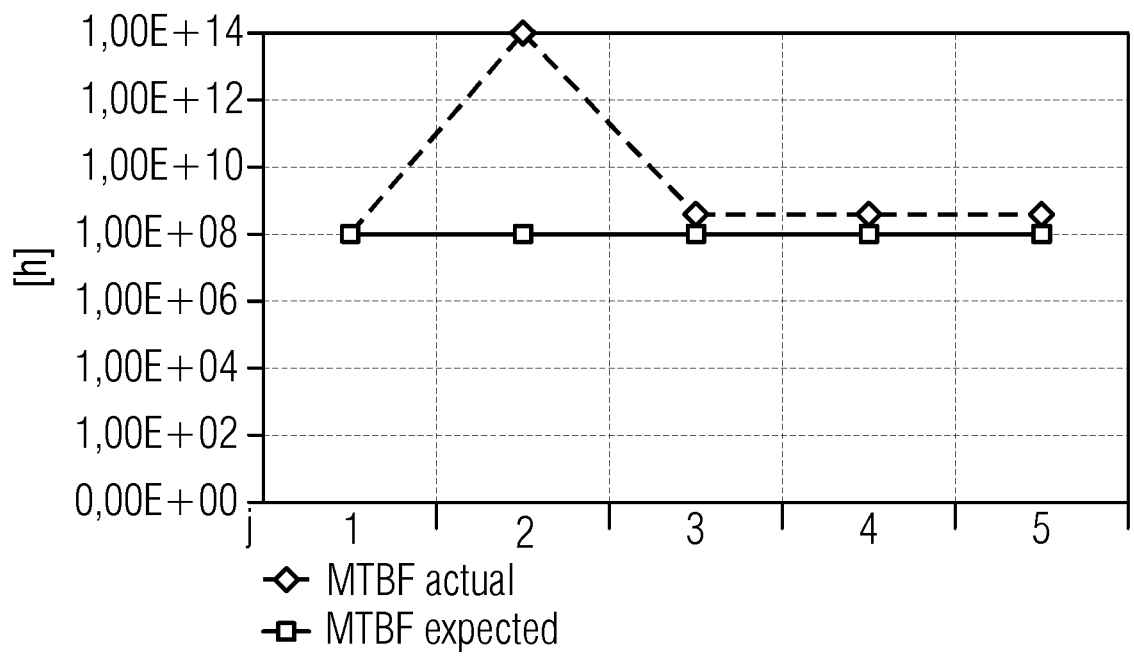
FIG. 15 shows another comparison between expected values and actual values of respective dependability parameters used to determine the dependability property fulfilment.

FIG. 15 shows the comparison of the expected and actual values for the Mean Time Between Failures MTBF (relevant for the dependability property "Reliability") for j=1 . . . 5 (horizontal axis) in hours.

Figure 16:
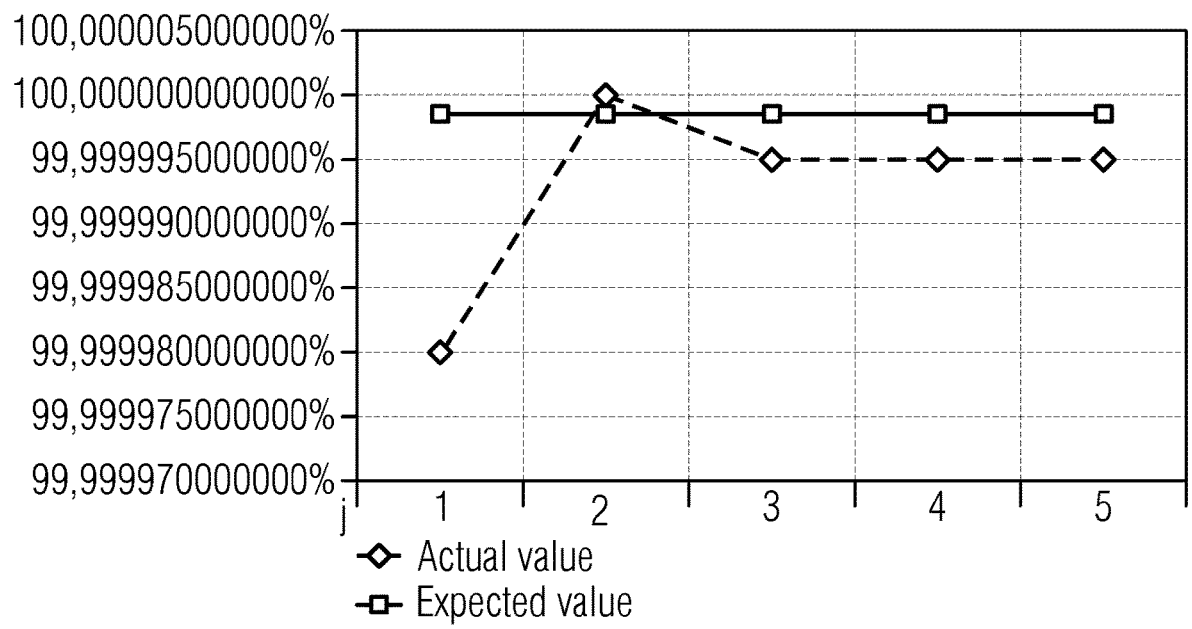
FIG. 16 shows another comparison between expected values and actual values of respective dependability parameters used to determine the dependability property fulfilment.

FIG. 16 shows the comparison of the expected and actual values for the Availability value A (relevant for the dependability property "Availability") for j=1 . . . 5 (horizontal axis) in percent.

Figure 17:
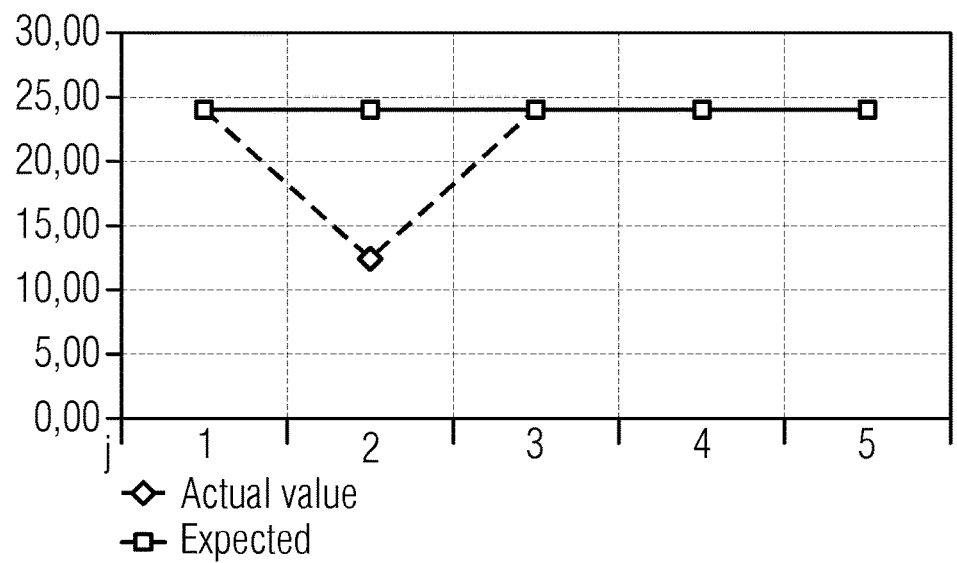
FIG. 17 shows another comparison between expected values and actual values of respective dependability parameters used to determine the dependability property fulfilment.

FIG. 17 shows the comparison of the expected and actual values for a Maintainability (mean down time) value (relevant for the dependability property "Maintainability") for j=1 . . . 5 (horizontal axis) in hours.

Figure 18:
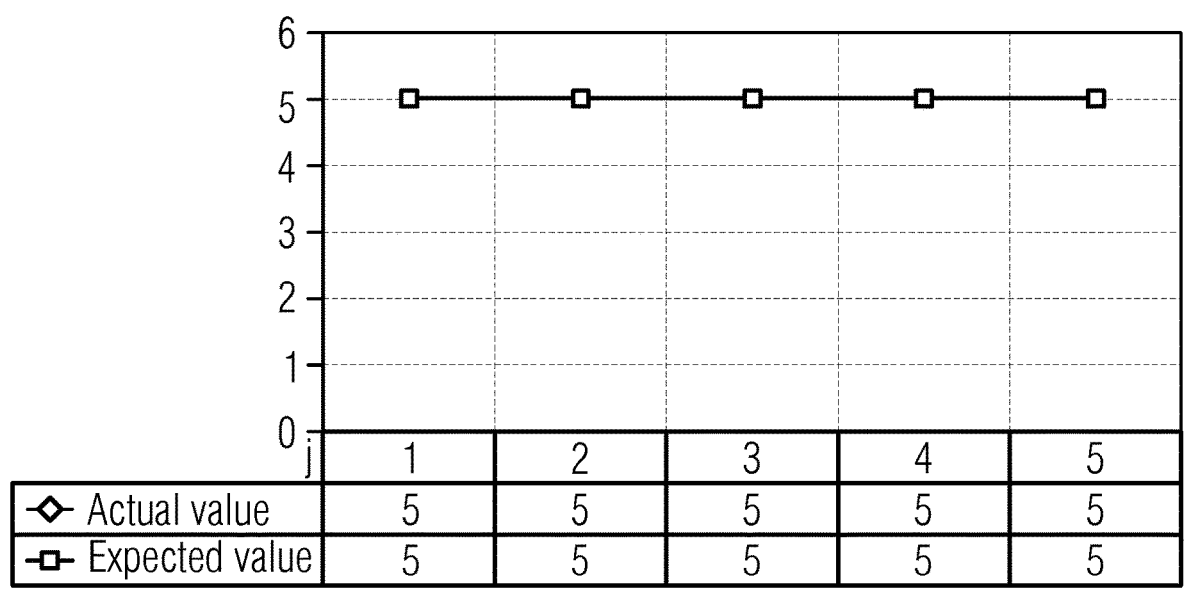
FIG. 18 shows another comparison between expected values and actual values of respective dependability parameters used to determine the dependability property fulfilment.

FIG. 18 shows the comparison of the expected and actual values for a Security Assurance Level (relevant for the dependability property "Security") for j=1 . . . 5 (horizontal axis) in levels.

FIG. 14 clearly shows that the redundancy measure M1 (j=2) has the lowest Failure Rate. Thus, based on the Failure Rate alone, the redundancy measure M1 (j=2) is the best measure. FIG. 14 through FIG. 18 show that, with the exception of the Security Assurance Level in FIG. 18 which is equal for all candidate system configuration "j" (assumed here for simplicity), the redundancy measure M1 (j=2) is quantitatively the best measure.

Next, according to the trade-off analysis criteria described in the foregoing, the dependability property fulfilment values $X_{ij}$ will be calculated. In the present result, this is done simply based on the actual and expected determined dependability parameter values as shown in FIG. 14 through FIG. 18. It will be understood that this calculation may be more complex and may comprise a plurality of comparisons, e.g. to different threshold values (upper/lower limits etc.) for each determined dependability parameter.

The result of the present analysis is a number between 0 and 1 for the dependability property fulfilment values $X_{ij}$ which will be multiplied by the assigned dependability property weighting factor $K_i$ of the respective dependability property "i". In the present example, the dependability property "Safety" has the weight of $K_i$=100, the dependability property "Reliability" the weight of $K_2$=10 and so on as has been described in the foregoing. These products $P_{ij}=K_i*X_{ij}$ will be summed up, and the sum is then the $DPN_j$ of the respective candidate system configuration (corresponding to at least one measure) "j".

FIG. 19 shows a table illustrating some results of the previous analysis. On the left side, the expected values (here: 100, 10, 1, 0.1 and 0.01) are shown. "DPN1 (actual)" indicates the dependability priority number $DPN_1$ of the basic candidate system configuration with j=1, i.e. without any additional measures. "DPN1 (expected" shows the expected value $DPN^{expected}$ for all of the candidate system configurations "j". "Dependable 1?" indicates whether $DPN_1$=88,91 is such that the candidate system configuration j=1 is considered to be dependable or not. Here the result is "No", as in this example the difference between the actual $DPN_1$=88,91 is too small compared to the expected value $DPN^{expected}$=111,11.

FIG. 20 shows results for the dependability priority numbers $DPN_j$ for j=1 . . . 5. In the comparison of the dependability priority numbers $DPN_j$, the #redundancy measure M1 (j=2) shows the highest value. Its $DPN_2$ is equal to the expected value $DPN^{expected}$=111,11. In the present example, then this measure (i.e. candidate system configuration j=2) is selected.

The analysis also provides the additional information that, when using monitoring circuits (j=3, 4, 5), even a significant improvement of the Failure Rate of the monitoring circuits (e.g. from 10000 FIT at j=3 to 1 FIT at j=5) does not bring any change in the dependability priority number: $DPN_3=DPN_4=DPN_5$. In other words, if for some reason an expert would still decide to employ the measure "monitoring", the expert would know that a simpler monitoring circuit with e.g. 10000 FIT (as in j=3) is sufficient.

FIG. 21 shows a comparison of the individual products $K_i*X_{ij}$ for j=1 . . . 5 (columns) and i=1 . . . 5 (lines, here indicated by the values for the $K_i$ of 100, 10 and so on). FIG. 21 clearly illustrates how the dependability property "Availability" is massively reduced for j=3,4,5 compared to j=2 or even to j=1.

FIG. 22 shows a comparison of the dependability priority numbers $DPN_j$ for j=1 . . . 5. FIG. 22 clearly illustrates the significant improvement with respect to the dependability priority number $DPN_j$ of candidate system configuration j=2 over candidate system configuration j=1 as well as the slight advantage of candidate system configuration j=2 over the candidate system configurations j=3,4,5.

In other words: the redundancy measure M1 (j=2) yields the best result of Safety and Availability, the monitoring measure M2 with a monitoring circuit of 10000 FIT j=3) keeps the Safety almost at the same level, but the Availability goes down dramatically.

By comparing an acceptable lower limit $A_{lim,low}$ for the Availability value A and the actual Availability value $A_j$ for the candidate system configurations "j", it may then be determined that the candidate system configuration with j=2 is the only one measure that fulfils the availability goal.

Thus in the present example the decision has been made, namely the redundancy measure M1 j=2) is the measure that fulfils all the dependability property goals, incl. the availability goal. If this is not the case, then further analyses may be performed. In the case of none of the current measures fulfils all of the set dependability property goals, new measures will have to be introduced. It is possible in the practice that no available measure fulfils all the dependability property goals. In this case, a compromise solution may have to be accepted, e.g. in that the measure that fulfils most dependability property goals or fulfils the most important dependability property goals will be chosen. As has been described in the foregoing, this can also be achieved by comparing individual digits of the dependability priority numbers $DPN_j$ separately and according to a defined hierarchy that indicates the respective importance of the dependability properties "i".

In case of conflict between the dependability property goals, there are at least the following ways to handle this issue:
1. analysis of new alternative measures; and/or
2. if the conflicts cannot be solved, e.g. because an improvement towards one dependability property goal impacts at least one other dependability property goal so negatively that that dependability property goal cannot be fulfilled, a compromise has to be made.

In the conventional art, statements about the quality of dependability properties are obtained by different analysis techniques separately, but an overall statement in value about dependability which is obtained by the quantitative dependability analyses is missing.

By introducing the Dependability Priority Number DPN as described herein, candidate system configurations (design alternatives) such as measures for mitigating a hazard risk are analyzed qualitatively and quantitatively towards an overall statement of quality of the dependability of the candidate system configurations.

The dependability priority number DPN describes the overall dependability properties (and the fulfilment of demands thereon) efficiently, and the conflicts and dependencies between the dependability properties can be solved efficiently. By determining conflicts and dependencies between the dependability properties, avoidable penalties and possible additional costs which are caused by ignorance or insufficient handling of possible conflicts between design alternatives and quality goals are minimized.

FIG. 23 shows a schematic block diagram illustrating an apparatus 1000 according to an embodiment of the second aspect of the present invention for determining an optimal system configuration out of a plurality of candidate system configurations "j". The apparatus 1000 is configured and adapted to perform the method according to an embodiment of the first aspect of the present invention, in particular the method as has been described in the foregoing with respect to FIG. 1 and/or any of the options or variants as have been described with respect to FIG. 2 to FIG. 22. Thus, the apparatus 1000 may be adapted and modified according to any of the embodiments, modifications, variants and options as have been described for the method according to the first aspect of the present invention and vice versa.

The apparatus 1000 comprises a computing device 100 with an input interface 110, a processor 120, a memory 130 and an output interface 140. The input interface is configured to receive an input signal comprising data indicating a plurality of candidate system configurations "j", in particular as has been described with respect to step S10 in the foregoing.

The computing device 100 is configured (in particular, the processor 120 and the memory 130 are configured, by the memory 130 comprising executable program instructions executed by the processor 120) to implement a dependability metric module 210 and an optimizing module 220.

The dependability metric module 210 is configured to determine at least one quantitative dependability metric value (in particular the dependability priority number $DPN_j$) for each of the plurality of candidate system configurations "j",
 wherein the at least one quantitative dependability metric value for each of the plurality of candidate system configurations "j" is based on:
 a) a dependability property fulfilment value $X_{ij}$ for each of a list of dependability properties "i" for each individual candidate system configuration "j"; and further based on
 b) a dependability property weighting factor $K_i$ for each of the list of dependability properties "i" for all of the plurality of candidate system configurations "j".

In particular, the dependability metric module 210 is configured to perform step S20 according to any or all embodiments, variants, modifications or improvements as has been described in the foregoing.

The optimizing module 220 is configured to determine an optimal system configuration out of the plurality of candidate system configurations "j" based on a quantitative comparison between the at least one quantitative dependability metric value (in particular the dependability priority number $DPN_j$) for each of the plurality of candidate system configurations "j". In particular, the optimizing module 220 is configured to perform step S30 according to any or all embodiments, variants, modifications or improvements as has been described in the foregoing.

The output interface 140 is configured to output an output signal 72 indicating the determined optimal system configuration.

The apparatus 1000 (in particular the output interface 140 of the computing device 100) may be configured to transmit the output signal 72 to a machine 300. The machine 300 may be part of the apparatus 1000 or may be external to the apparatus 1000.

The machine 300 may e.g. be a producing machine configured to produce systems and able to produce system in particular according to the determined optimal system configuration. The machine 300 and the output signal 72 may be configured such that the output signal 72 controls the machine 300 to produce the system with the determined optimal system configuration.

Alternatively, or additionally, the machine 300 may be a gathering machine configured to gather raw materials and/or input components based on the determined optimal system configuration and/or a composing machine configured to compose a manual, a blueprint, a list of instructions, an explosion view and/or the like which indicates how the system having the determined optimal system configuration is to be produced. The output signal 72 may be adapted to control any of the machines that are part of the apparatus in any given embodiment of the second aspect.

FIG. 24 schematically illustrates a computer program product 400 comprising executable program instructions 450 configured to, when executed, perform the method according to the second aspect of embodiments of the present invention, in particular as has been described with respect to the previous figures.

FIG. 25 schematically illustrates a non-transient computer-readable data storage medium 500 comprising executable program instructions 550 configured to, when executed, perform the method according to the second aspect of embodiments of the present invention, in particular as has been described with respect to the previous figures.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for providing an optimal system configuration out of a plurality of candidate system configurations, the method comprising:
 performing a component fault tree analysis with a corresponding Reliability, Availability, Maintainability and Safety (RAMS) analysis for each of a plurality of candidate systems configurations j;
 receiving data indicating the plurality of candidate system configurations j, wherein the received data includes a plurality of actual values associated with a plurality of dependable properties i obtained by the performing the component fault tree analysis with the corresponding RAMS analysis for each of the plurality of candidate systems configurations j;
 determining expected or reference values for each of the plurality of parameters;
 comparing the plurality of actual values with the expected or reference values for each of the plurality of dependable properties i for each of the plurality of candidate systems j;
 determining at least one quantitative dependability metric value for each of the plurality of candidate system configurations j,
 wherein the at least one quantitative dependability metric value for each of the plurality of candidate system configurations j is based on
 a) determining a dependability property fulfilment value $X_{ij}$ for each of the plurality of dependability properties i for each individual candidate system configuration j, wherein the dependability property fulfilment value $X_{ij}$ depends from the comparing the plurality of actual values with the expected or reference values for each of the plurality of dependable properties i for each of the plurality of candidate systems j; and further based on b) weighing the dependability property fulfilment value $X_{ij}$ for each of the plurality of dependability properties i using a dependability property weighting factor $K_i$ for each of the list of dependability properties i for all of the plurality of candidate system configurations j;

determining an optimal system configuration out of the plurality of candidate system configurations j based on a quantitative comparison between the at least one quantitative dependability metric value for each of the plurality of candidate system configurations j;

generating an output signal based on the determined optimal system configuration;

transmitting the output signal to a producing machine; and controlling the producing machine, by the output signal, to produce a system having the determined optimal system configuration.

2. The method of claim 1, wherein the at least one quantitative dependability metric for each of the plurality of candidate system configurations j is based on mathematical products of dependability property fulfilment values $X_{ij}$ with their respective dependability property weighting factor $K_i$.

3. The method of claim 2, wherein for each of the plurality of candidate system configurations j a single dependability priority number $DPN_j$ as a quantitative dependability metric value is determined.

4. The method of claim 3, wherein the dependability priority number $DPN_j$ is based on of: the mathematical products of the dependability property fulfilment values $X_{ij}$ with their respective dependability property weighting factor $K_i$.

5. The method of claim 1, wherein the dependability property fulfilment values $X_{ij}$ are determined within a respective predetermined value range, and wherein the dependability property weighting factors $X_{ij}$ and the respective predetermined value ranges are determined such that the total value ranges of the products between dependability property values and dependability weighting factors $K_i$ are distinct for each of the dependability properties j.

6. The method of claim 5, wherein the predetermined value ranges for the dependability property fulfilment values $X_{ij}$ are given by a lower limit and an upper limit each, and wherein the lower limits for all dependability properties i are the same and/or wherein the upper limits for all dependability properties i are the same.

7. The method of claim 1, wherein the dependability property weighting factors $K_i$ differ from one another only by powers of ten.

8. The method of claim 1, wherein the dependability properties i comprise any or all of:
Safety;
Reliability;
Availability;
Maintainability; and/or
Security.

9. The method of claim 1, further comprising a step of determining, for at least one of the dependability properties i, the dependability property fulfilment values $X_{ij}$ for the candidate system configurations j by comparing an actual dependability property value of each candidate system configuration for the corresponding dependability property with a target dependability property value for the dependability property i.

10. A computer program product, comprising a computer readable hardware storage device having computer readable program code stored therein, said program code executable by a processor of a computer system to implement a method comprising executable program instructions configured to, when executed, perform the method according to claim 1.

11. An apparatus for providing an optimal system configuration out of a plurality of candidate system configurations j, the apparatus comprising:

a computing device with an input interface, a processor, a memory and an output interface, wherein the computing device is configured to perform a component fault tree analysis with a corresponding Reliability, Availability, Maintainability and Safety (RAMS) analysis for each of a plurality of candidate systems configurations j;

wherein the input interface is configured to receive an input signal comprising data indicating the plurality of candidate system configurations j, wherein the received data includes a plurality of actual values associated with a plurality of dependable properties i obtained by the component fault tree analysis with the corresponding RAMS analysis for each of the plurality of candidate systems configurations j;

wherein the computing device is configured to determine expected or reference values for each of the plurality of parameters;

wherein the computing device is configured to compare the plurality of actual values with the expected or reference values for each of the plurality of dependable properties i for each of the plurality of candidate systems j;

wherein the computing device is configured to implement a dependability metric module and an optimizing module;

wherein the dependability metric module is configured to determine at least one quantitative dependability metric value for each of the plurality of candidate system configurations j, wherein the at least one quantitative dependability metric value for each of the plurality of candidate system configurations j is based on a) determining a dependability property fulfilment value $X_{ij}$ for each of the plurality of dependability properties i for each individual candidate system configuration j, wherein the dependability property fulfilment value $X_{ij}$ depends from the comparing the plurality of actual values with the expected or reference values for each of the plurality of dependable properties i for each of the plurality of candidate systems j; and further based on b) weighing the dependability property fulfilment value $X_{ij}$ for each of the plurality of dependability properties i using a dependability property weighting factor $K_i$ for each of the list of dependability properties i for all of the plurality of candidate system configurations j;

wherein the optimizing module is configured to determine an optimal system configuration out of the plurality of candidate system configurations j based on a quantitative comparison between the at least one quantitative dependability metric value for each of the plurality of candidate system configurations j;

wherein the output interface is configured to output an output signal indicating the determined optimal system configuration; and a producing machine, wherein the output signal and the producing machine are configured such that the producing machine is controlled by the output signal to produce a system having the determined optimal system configuration.

* * * * *